United States Patent
Shin et al.

(10) Patent No.: US 10,054,946 B2
(45) Date of Patent: Aug. 21, 2018

(54) ELECTRONIC DEVICE AND OPERATING METHOD THEREOF

(71) Applicant: Samsung Electronics Co., Ltd., Gyeonggi-do (KR)

(72) Inventors: Young-Chul Shin, Gyeonggi-do (KR); Wu Seong Lee, Sejong-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/658,036

(22) Filed: Jul. 24, 2017

(65) Prior Publication Data
US 2018/0059665 A1    Mar. 1, 2018

(30) Foreign Application Priority Data
Aug. 23, 2016  (KR) .......... 10-2016-0106766

(51) Int. Cl.
*G05D 1/12* (2006.01)
*B64D 47/08* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC .......... G05D 1/0094; G05D 1/10; G05D 1/12; B64C 13/20; B64C 39/024; B64D 47/08; H04N 5/2306
(Continued)

(56) References Cited

U.S. PATENT DOCUMENTS 9,253,460 B1     2/2016  Wang
9,580,173 B1 *   2/2017  Burgess ............... B64C 39/024
(Continued)

FOREIGN PATENT DOCUMENTS

EP    2 759 480       7/2014
KR    10-1574601      12/2015
KR    1020160045248   4/2016

OTHER PUBLICATIONS

Franck Ruffier, et al., "Optic flow regulation: the key to aircraft automatic guidance", Science Direct, Robotics and Autonomous Systems 50 (2005) 177-194.
(Continued)

*Primary Examiner* — Tan Q Nguyen
(74) *Attorney, Agent, or Firm* — The Farrell Law Firm, P.C.

(57) ABSTRACT

An electronic device is provided. The electronic device includes a gimbal; a first camera; a second camera to detect a point of interest on ground; at least one sensor; a first motor; a second motor to operate the first camera and the second camera to maintain horizontality; and at least one processor electrically connected to the first camera, the second camera, the at least one sensor, the first motor, and the second motor, wherein the at least one processor is configured to detect a change in an angle; control the second motor to control the second camera to maintain horizontality; determine whether the point of interest is changed; if the point of interest is not changed, control the first motor to maintain hovering; and, if the point of interest is changed, control the first motor to maintain hovering by moving to original position before moving and compensating for tilt.

20 Claims, 19 Drawing Sheets

(51) Int. Cl.
*G05D 1/00* (2006.01)
*B64C 39/02* (2006.01)
*G03B 15/00* (2006.01)
*G03B 17/56* (2006.01)
*G06K 9/00* (2006.01)
*G06K 9/20* (2006.01)
*H04N 5/232* (2006.01)

(52) U.S. Cl.
CPC ......... *G03B 15/006* (2013.01); *G03B 17/561* (2013.01); *G06K 9/0063* (2013.01); *G06K 9/209* (2013.01); *H04N 5/2328* (2013.01); *H04N 5/23206* (2013.01); *H04N 5/23258* (2013.01); *H04N 5/23296* (2013.01); *B64C 2201/127* (2013.01)

(58) Field of Classification Search
USPC .......................................................... 701/3
See application file for complete search history.

(56) References Cited

U.S. PATENT DOCUMENTS

| 2011/0221900 | A1 | 9/2011 | Reich | |
| 2016/0144957 | A1* | 5/2016 | Claridge | B64C 29/02 244/6 |
| 2016/0198088 | A1 | 7/2016 | Wang et al. | |
| 2017/0158320 | A1* | 6/2017 | Bosch | B64C 27/52 |
| 2017/0341776 | A1* | 11/2017 | McClure | B64D 47/08 |

OTHER PUBLICATIONS

Bruno Herisse, et al., "Landing a VTOL Unmanned Aerial Vehicle on a Moving Platform Using Optical Flow", IEEE Transactions on Robotics, vol. 28, No. 1, Feb. 2012, pp. 77-89.
International Search Report dated Oct. 25, 2017 issued in counterpart application No. PCT/KR2017/008778, 8 pages.

\* cited by examiner

ELECTRONIC DEVICE AND OPERATING METHOD THEREOF

PRIORITY

This application claims priority under 35 U.S.C. § 119(a) to a Korean Patent Application filed on Aug. 23, 2016 in the Korean Intellectual Property Office and assigned Serial No. 10-2016-0106766, the entire contents of which are incorporated herein by reference.

BACKGROUND

1. Field of the Disclosure

The present disclosure relates generally to a method and an apparatus for flying an unmanned electronic device (for example, an unmanned aerial vehicle (UAV), a drone, and the like) which is able to fly, and more particularly, to a method and an apparatus for maintaining a stable hovering state of an unmanned electronic device.

2. Description of the Related Art

In recent years, electronic devices which are able to fly and film have been developed and distributed. Such electronic devices have been used for professional purposes like filming for broadcasting, but in recent years, they are increasingly utilized for personal purposes since they have been miniaturized and their cost has been reduced. In general, an electronic device having a shape of a UAV or a multicopter (for example, a helicopter), which can be flown and controlled by guided radio waves, is defined as a drone. In the following descriptions, a UAV or a drone is referred to as an unmanned electronic device.

Unmanned electronic devices such as UAVs or drones have been implemented to be capable of automatic flight (or autonomous flight) as well as manual flight which is controlled by a user using a remote controller (RC). An unmanned electronic device may include a function for maintaining a stationary state (for example, a hovering state) at a certain position (for example, a position within a three-dimensional space) during an automatic flight. An unmanned electronic device may be configured to include a camera or a sensor of a certain function (for example, an optical flow sensor (OFS) module) to maintain a hovering state. The OFS module of a current unmanned electronic device may be mounted on a bottom surface of the unmanned electronic device and may be fixed to face the ground during a flight of the unmanned electronic device.

If an unmanned electronic device is in a hovering state, the unmanned electronic device may drift slightly in a horizontal direction due to operation of a propeller. In this case, the unmanned electronic device may identify a movement of a point of interest on the ground through the OFS module, and may control an automatic flight so as to return to the original position.

When the unmanned electronic device is in the hovering state, the airframe of the unmanned electronic device may be tilted due to an external factor (for example, an external force, an external wind, and the like) as well as drifting due to the operation of the propeller. In this case, the OFS module mounted on the bottom surface of the unmanned electronic device may be tilted at an angle corresponding to a tilt angle of the unmanned electronic device. Accordingly, the point of interest on the ground which is photographed (or identified) by the OFS module according to the tilt angle may be changed. For example, the unmanned electronic device may identify the point of interest on the ground as being moved by means of the OFS module, and may generate a flight control signal to return to the original position. However, since the real position of the unmanned electronic device is fixed, the flight control signal may cause the unmanned electronic device to perform unnecessary operations. To solve this problem, a conventional method minimizes the flight control signal through calculation using the tilt of the unmanned electronic device based on an input image of the OFS module. However, this method is inaccurate, causes a delay, and requires a calculation to be performed.

SUMMARY

An aspect of the present disclosure provides a method and an apparatus for controlling an automatic flight (autonomous flight) of an unmanned electronic device.

Another aspect of the present disclosure provides a method and an apparatus for maintaining a stable hovering state of an unmanned electronic device.

Another aspect of the present disclosure provides a method and an apparatus for maintaining a camera or a sensor (for example, an OFS module) of a certain function mounted in an unmanned electronic device to always be horizontal to the ground.

Another aspect of the present disclosure provides a method and an apparatus for maintaining a stable hovering state if the hovering state is maintained through an OFS module mounted in an unmanned electronic device while it is difficult to maintain a horizontal state of the unmanned electronic device due to an external factor (for example, an external force, wind, and the like).

According to an aspect of the present disclosure, an electronic device is provided. The electronic device includes a gimbal; a first camera configured to record an image; a second camera configured to detect a point of interest on a ground as an input image; at least one sensor configured to detect a motion of the electronic device; a first motor configured to generate a thrust related to a flight of the electronic device; a second motor configured to operate the first camera and the second camera to maintain horizontality; and at least one processor electrically connected to the first camera, the second camera, the at least one sensor, the first motor, and the second motor, wherein the at least one processor is configured to detect a change in an angle of the electronic device by the at least one sensor during a hovering operation of the electronic device; control the second motor to control the second camera to maintain horizontality in response to the change in the angle of the electronic device; determine whether the point of interest is changed based on an input image of the second camera; if the point of interest is not changed, control the first motor to maintain hovering by compensating for a tilt of the electronic device; and, if the point of interest is changed, control the first motor to maintain hovering by moving to an original position before moving and by compensating for the tilt, wherein, if compensating for the tilt, the at least one processor is further configured to control the second motor to control the second camera to maintain horizontality.

According to another aspect of the present disclosure, a method of operating an electronic device is provided. The method includes controlling hovering of the electronic device using a first motor for a thrust related to a flight of the electronic device; during a hovering operation of the electronic device, controlling to maintain horizontality of a first camera for taking an image and horizontality of a second camera for detecting a point of interest on a ground as an input image; detecting a change in an angle of the electronic device during the hovering operation of the electronic device; controlling the second motor to maintain horizontality of the second camera in response to the change in the angle of the electronic device; determining whether the point of interest is changed based on an input image of the second camera; if the point of interest is not changed, controlling the first motor to maintain the hovering of the electronic device by compensating for a tilt of the electronic device; and if the point of interest is changed, controlling the first motor to maintain the hovering of the electronic device by moving to an original position before moving and by compensating for the tilt, wherein, if compensating for the tilt, controlling the second motor to control the second camera to maintain horizontality.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
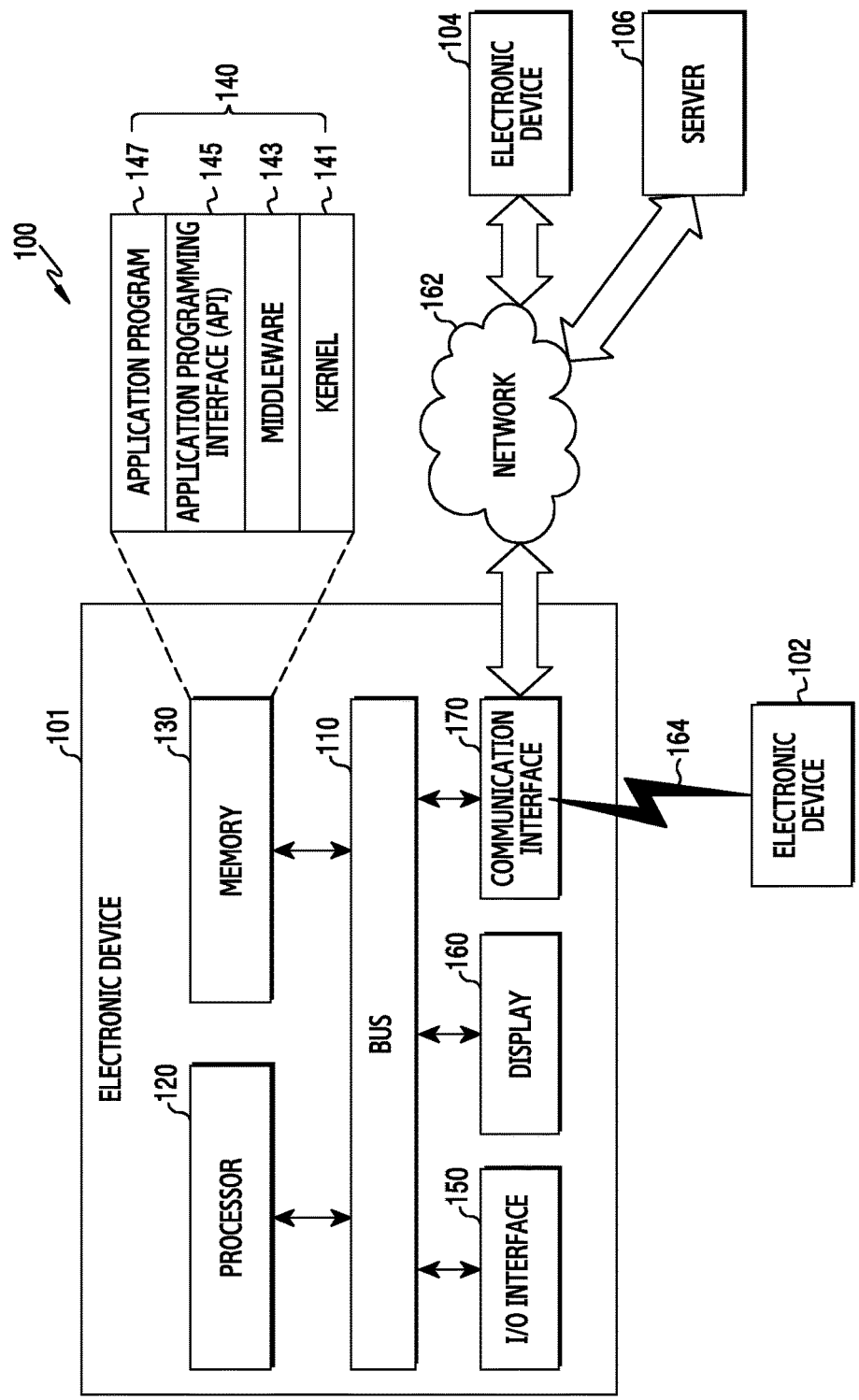
FIG. 1 is a block diagram of a network environment including an electronic device according to an embodiment of the present disclosure.

Various embodiments of the present disclosure are described below with reference to the accompanying drawings. However, embodiments of the present disclosure and terms used herein are not intended to limit the present disclosure, but are intended to be construed as including modifications, equivalents and/or alternatives of the present disclosure. In the description of the accompanying drawings, similar reference numerals are used for similar elements. The terms of a singular form may include plural forms unless otherwise specified.

The terms "A or B" or "at least one of A and/or B" used in the present disclosure include any and all combinations of the associated listed items. The terms such as "first" and "second" may be used in the present disclosure to modify various elements regardless of the order or importance of the elements, and are not intended to limit the present disclosure. These terms are used to distinguish one element from another. It will be understood that, when an element (for example, a first element) is described as being "operatively or communicatively coupled with/to" or "connected to" another element (for example, a second element), the element may be directly coupled or connected to the other element, or there may be an intervening element (for example, a third element) between the element and the other element.

The term "configured (or set) to . . . " used in the present disclosure may be used interchangeably with the terms "suitable for . . . ," "having the capacity to . . . ," "adapted to . . . ," "made to . . . ," "capable of . . . ," or "designed to" in hardware or software depending on the situation. In a certain situation, the term "a device configured to . . . " may indicate "the device being capable of . . . " with another device or parts. For example, "a processor configured (set) to perform A, B, and C" may indicate a dedicated processor (for example, an embedded processor) for performing a corresponding operation, or a general purpose processor (for example, a central processing unit (CPU) or an application processor (AP)) for performing corresponding operations by executing one or more software programs stored in a memory device.

An electronic device according to an embodiment of the present disclosure may include an unmanned electronic device such as a UAV of a multicopter (for example, a quadcopter, a tricopter, a hexacopter, an octocopter, and the like) or a drone. The electronic device is not intended to be limited to the above-described devices. For example, the electronic device may include an electronic device provided with a propeller or a rotor (for example, a rotation blade) and providing an unmanned flight function. The electronic device may include all types of devices which use one or more of various processors such as an AP, a communication processor (CP), a graphics processing unit (GPU), and a CPU. The term "user" may refer to a person who uses the electronic device or a device that uses the electronic device (for example, an artificial intelligence electronic device).

FIG. 1 is a block diagram of a network environment 100 including an electronic device 101 according to an embodiment of the present disclosure.

Referring to FIG. 1, the electronic device 101 may include a bus 110, a processor 120, a memory 130, an input/output interface 150, a display 160, and a communication interface 170. According to an embodiment of the present disclosure, the electronic device 101 may exclude at least one of the above-described elements or may further include other element(s).

The bus 110 may interconnect the above-described elements 110 to 170 and may include a circuit for conveying communications (e.g., a control message or data) among the above-described elements 110-170.

The processor 120 may include one or more of a CPU, an AP, or a CP. The processor 120 may perform, for example, an operation or data processing associated with control and/or communication of at least one other element(s) of the electronic device 101. A processing (or control) operation of the processor 120 according to various embodiments of the present disclosure are described below in greater detail with reference to the accompanying drawings.

The memory 130 may include a volatile memory and/or a nonvolatile memory. The memory 130 may store instructions or data associated with at least one other element(s) of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least a portion of the kernel 141, the middleware 143, or the API 145 may be referred to as an operating system (OS).

The memory 130 may store one or more programs which are executed by the processor 120, and may perform a function of temporarily storing inputted/outputted data. According to an embodiment of the present disclosure, the memory 130 may store acquired data, may store data acquired in real time in a temporary storage device, and may store data determined to be stored in a storage device which can store data for a long time. The memory 130 may include a non-transitory computer-readable recording medium having a program recorded thereon, for executing a method in the processor 120.

The kernel 141 may control or manage system resources (e.g., the bus 110, the processor 120, the memory 130, and the like) that are used to execute operations or functions of other programs (e.g., the middleware 143, the API 145, and the application 147). Furthermore, the kernel 141 may provide an interface that allows the middleware 143, the API 145, or the application 147 to access discrete elements of the electronic device 101 so as to control or manage system resources.

The middleware 143 may perform a mediation role such that the API 145 or the application 147 communicates with the kernel 141 to exchange data. The middleware 143 may process one or more task requests received from the application 147 according to a priority. For example, the middleware 143 may assign a priority, which makes it possible to use a system resource (e.g., the bus 110, the processor 120, the memory 1830, and the like) of the electronic device 101, to at least one application 147, and may process the one or more task requests.

The API 145 may be an interface through which the application 147 controls a function provided by the kernel 141 or the middleware 143, and may include, for example, at least one interface or function (e.g., an instruction) for file control, window control, image processing, character control, and the like.

The input/output interface 150 may transmit an instruction or data, inputted from a user or an external device, to other element(s) of the electronic device 101. Furthermore, the input/output interface 150 may output an instruction or data, received from other element(s) of the electronic device 101, to a user or an external device. For example, the input/output interface 150 may include an external charger port, a wire/wireless data port, a memory card port, an audio input/output port, a video input/output port, and the like.

The display 160 may include, for example, a liquid crystal display (LCD), a light-emitting diode (LED) display, an organic LED (OLED) display, an active matrix OLED (AMOLED), a microelectromechanical systems (MEMS) display, or an electronic paper display. The display 160 may display, for example, various contents (e.g., a text, an image, a video, an icon, and/or a symbol) to a user. The display 160 may include a touch screen and may receive, for example, a touch, a gesture, a proximity input, or a hovering input using an electronic pen or a portion of a user's body.

The display 160 may show a visual output to a user, for example. The visual output may be displayed in the form of a text, a graphic, a video or a combination thereof. The display 160 may display (output) a variety of information processed in the electronic device 101. For example, the display 160 may display a user interface (UI) or a graphical user interface (GUI) related to the use of the electronic device.

According to an embodiment of the present disclosure, the display 160 may display various UIs or GUIs associated with an operation performed by the electronic device 101. For example, the display 160 may display an image which is recorded or taken by a camera, and may display various menus for setting the electronic device 101 (for example, for setting a flight-related function). The display 160 may be excluded from the electronic device 101.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with the second external electronic device 104 or the server 106.

Wireless communication may include cellular communication using at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like.

According to an embodiment of the present disclosure, the wireless communication may include, for example, at least one of wireless fidelity (WiFi), light fidelity (LiFi), wireless gigabit alliance (WiGig), Bluetooth (BT), Bluetooth low energy (BLE), Zigbee, near field communication (NFC), magnetic secure transmission (MST), radio frequency (RF), or a body area network (BAN).

According to an embodiment of the present disclosure, the wireless communication may include a global navigation satellite system (GNSS). The GNSS may include, for example, a global positioning system (GPS), a global navigation satellite system (Glonass), a BeiDou navigation satellite system (BeiDou) or Galileo, the European global satellite-based navigation system. Hereinafter, GPS and GNSS may be used interchangeably.

Wired communication may include at least one of, for example, a universal serial bus (USB), a high-definition multimedia interface (HDMI), a recommended standard-232 (RS-232), power line communication, or a plain old telephone service (POTS).

The network 162 may include at least one of telecommunications networks, for example, a computer network (e.g., a local area network (LAN) or a wide area network (WAN)), an internet, or a telephone network.

Each of the first and second external electronic devices 102 and 104 may be the same or different type of device as or from the electronic device 101 (for example, a smart phone, a tablet personal computer (PC), a remote controller, and the like). According to an embodiment of the present disclosure, all or a part of operations that the electronic device 101 may perform may be executed by another or plural other electronic devices (e.g., the electronic devices 102 and 104 and the server 106). In a case where the electronic device 101 may execute any function or service automatically or in response to a request, the electronic device 101 may not perform the function or the service internally, but, alternatively or additionally, may request at least a portion of the function or service associated with the electronic device 101 be performed at the electronic device 102, the electronic device 104 or the server 106. The electronic device 102, the electronic device 104 or the server 106 may execute the requested function or additional function and may transmit the result of executing the function to the electronic device 101. The electronic device 101 may provide the requested function or service using the result received or may additionally process the result received to provide the requested function or service. To provide the requested function or service, for example, cloud computing, distributed computing, or client-server computing may be used.

Figure 2:
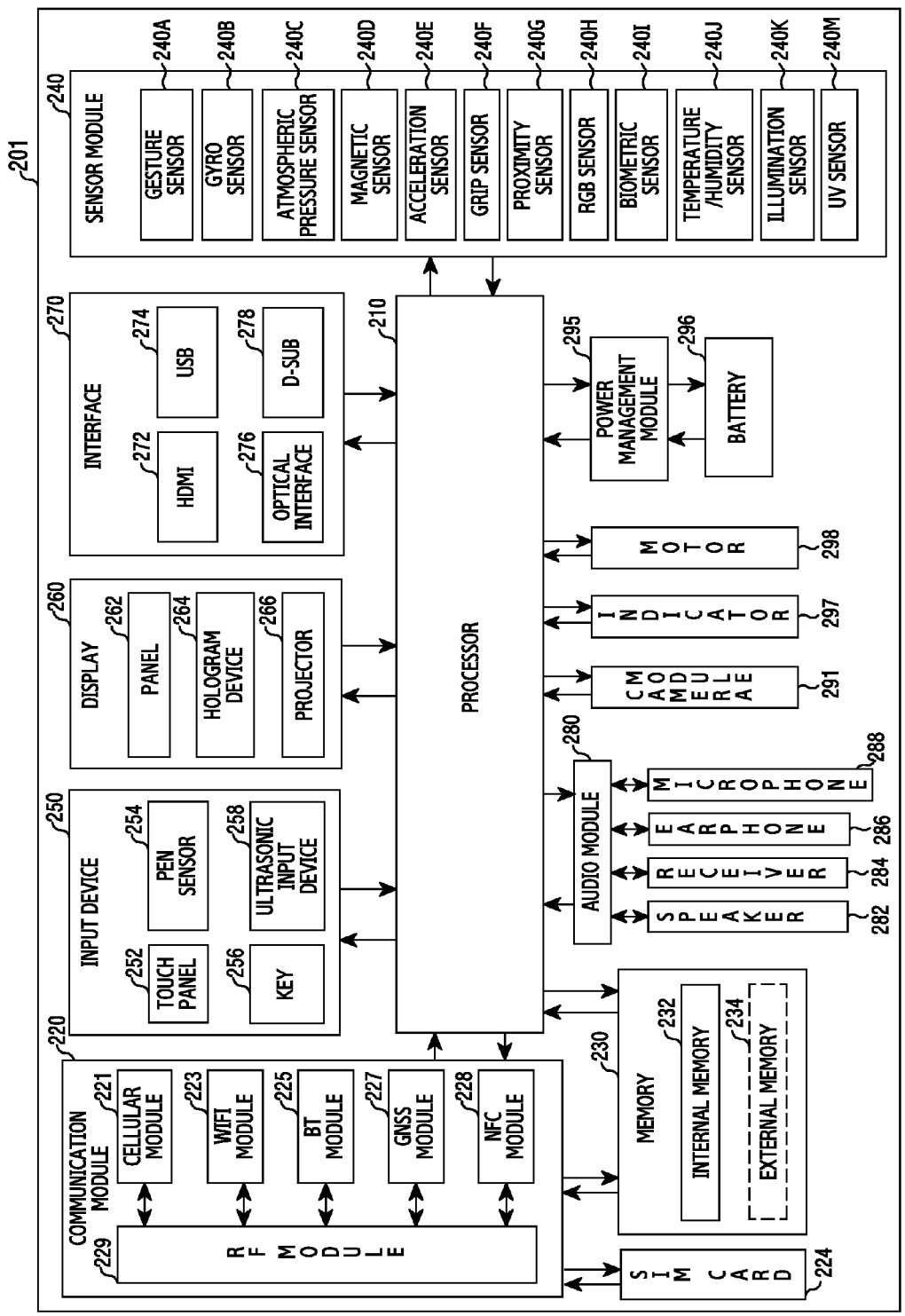
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, all or a part of the electronic device 101 illustrated in FIG. 1. The electronic device 201 may include one or more processors 210 (e.g., an AP), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

According to an embodiment of the present disclosure, the elements of the electronic device 201 shown in FIG. 2 are not essential and the electronic device 201 may include more elements than in FIG. 2 or may include fewer elements than in FIG. 2. For example, the electronic device 201 may exclude some elements according to its type. The above-described elements of the electronic device 201 may be seated in a housing (or a main body) of the electronic device 201 or may be formed outside the electronic device 201.

The processor 210 may drive an OS or an application program to control a plurality of hardware or software elements connected to the processor 210 and may process and compute a variety of data. The processor 210 may be implemented with a system on chip (SoC), for example. According to an embodiment of the present disclosure, the processor 210 may further include a GPU and/or an image signal processor (ISP). The processor 210 may include at least a part (e.g., a cellular module 221) of elements illustrated in FIG. 2. The processor 210 may load and process an instruction or data, which is received from at least one of the other elements (e.g., a nonvolatile memory) at a volatile memory, and may store resulting data at a nonvolatile memory.

According to an embodiment of the present disclosure, the processor 210 may control an overall operation of the electronic device 201. The processor 210 may include one or more processors. For example, the processor 210 may include, as separate elements, a CP, an AP, an interface (for example, a general purpose input/output (GPIO) interface), an internal memory, or may integrate these elements into one or more integrated circuits (ICs). The AP may perform various functions for the electronic device 201 by executing various software programs, and the CP may process and control voice communication and data communication. The processor 210 may execute a certain software module (for example, an instruction set) stored in the memory 230, and may perform various functions corresponding to the module.

According to an embodiment of the present disclosure, the processor 210 may control an operation of a hardware module such as the audio module 280, the interface 270, the display 260, the camera module 291, and the like. The processor 210 may be electrically connected to the display 260 and the memory 230 of the electronic device 201.

According to an embodiment of the present disclosure, the processor 210 may process an operation related to manual flight or automatic flight (or autonomous flight) of the electronic device 201, and an operation related to hovering of the electronic device 201. The processor 210 may control hovering of the electronic device 201 using a first motor for thrust related to flight of the electronic device 201, and an operation of, during a hovering operation of the electronic device 201, controlling to maintain horizontality of a first camera for taking an image and horizontality of a second camera for detecting a point of interest on the ground as an input image. The processor 210 may control an operation of detecting a change of angle of the electronic device 201 during a hovering operation of the electronic device 201, and an operation of controlling the second motor to maintain horizontality of the second camera in response to the change of angle.

According to an embodiment of the present disclosure, the processor 210 may process an operation of determining whether a point of interest is changed based on an input image of the second camera; an operation of, if the point of interest is not changed, controlling the first motor to maintain hovering by compensating for a tilt of the electronic device; an operation of, if compensating for the tilt, controlling the second motor to control the second camera to maintain horizontality; and an operation of, if the point of interest is changed, controlling the first motor to maintain hovering by moving to an original position before moving and by compensating for the tilt.

The processing (or control) operation of the processor 210 according to an embodiment of the present disclosure is described below in greater detail with reference to the accompanying drawings.

The communication module 220 may be configured the same as or similar to the communication interface 170 of FIG. 1. The communication module 220 may include a cellular module 221, a WiFi module 223, a Bluetooth module 225, a GNSS module 227, an NFC module 228, and an RF module 229. The communication module 220 may further include, for example, a WiGig module, a LiFi module, and the like. According to an embodiment of the present disclosure, the WiFi module 223 and the WiGig module may be integrated into a single IC.

The cellular module 221 may provide voice communication, video communication, a messaging service, an Internet service and the like through a communication network. According to an embodiment of the present disclosure, the cellular module 221 may perform discrimination and authentication of the electronic device 201 within a communication network using the SIM card 224, for example. The cellular module 221 may perform at least a portion of the functions that the processor 210 provides. The cellular module 221 may include a CP. At least a portion (e.g., two or more) of the cellular module 221, the WiFi module 223, the Bluetooth module 225, the GNSS module 227, and the NFC module 228 may be included within one IC or an IC package. The electronic device 201 may exclude the cellular module 221.

The RF module 229 may transmit and receive a communication signal (e.g., an RF signal). The RF module 229 may include a transceiver, a power amplifier module (PAM), a frequency filter, a low noise amplifier (LNA), an antenna, and the like. According to an embodiment of the present disclosure, at least one of the cellular module 221, the WiFi module 223, the Bluetooth module 225, the GNSS module 227, and the NFC module 228 may transmit and receive an RF signal through a separate RF module.

The WiFi module 223 may indicate a module for wirelessly connecting to the Internet and forming a wireless LAN link with the electronic device 102 or the server 106. The WiFi module 223 may be embedded inside or provided outside of the electronic device 201. Wireless Internet technology may use WiFi, LiFi, WiGig, Wibro, world interoperability for microwave access (WiMax), high speed downlink packet access (HSDPA), or millimeter wave (mmWave). The WiFi module 223 may transmit or receive various data of the electronic device 201 to or from an external electronic device by working with the external device which is connected to the electronic device 201 via a network (for example, a wireless Internet network) (for example, the network 162). The WiFi module 223 may always maintain an on state or may be turned on/off according to settings of the electronic device 201 or a user input.

The BT module 225 and the NFC module 228 may indicate, for example, short range communication modules for performing short range communication. The short range communication technology may use BT, BLE, RF identification (RFID), an Infrared Data Association (IrDA) standard, ultra wideband (UWB), ZigBee, NFC, and the like. The short range communication module may transmit or receive various data of the electronic device 201 to or from an external device by working with the electronic device 102 and the like connected to the electronic device 201 via a network (for example, a short range communication network). The short range communication module (for example, the BT module 225 and the NFC module 228) may always maintain an on state or may be turned on/off according to settings of the electronic device 201 or a user input.

The SIM card 224 may include, for example, an embedded SIM, and may include unique identification information (e.g., an integrated circuit card identifier (ICCID)) or subscriber information (e.g., integrated mobile subscriber identity (IMSI)). According to an embodiment of the present disclosure, the electronic device 210 may exclude the SIM card 224.

The memory 230 (e.g., a memory 130) may include an internal memory 232 or an external memory 234. For example, the internal memory 232 may include at least one of a volatile memory (e.g., a dynamic random access memory (DRAM), a static RAM (SRAM), or a synchronous DRAM (SDRAM)), and a nonvolatile memory (e.g., a one-time programmable read only memory (OTPROM), a programmable ROM (PROM), an erasable and programmable ROM (EPROM), an electrically erasable and PROM (EEPROM), a mask ROM, a flash ROM, a flash memory, a hard drive, or a solid state drive (SSD)). The external memory 234 may include a flash drive, for example, a compact flash (CF) drive, a secure digital (SD) memory card, a micro secure digital (Micro-SD) memory card, a mini secure digital (Mini-SD) memory card, an extreme digital (xD) memory card, a multimedia card (MMC), a memory stick, and the like. The external memory 234 may be functionally or physically connected to the electronic device 201 through various interfaces.

According to an embodiment of the present disclosure, the memory 230 may store one or more programs, data, or instructions that cause the processor 210 to detect an change in angle of the electronic device 201 during a hovering operation of the electronic device 201, and to control the second motor to maintain horizontality of the second camera in response to the change in angle change.

According to an embodiment of the present disclosure, the memory 230 may store one or more programs, data, or instructions that cause the processor 201 to determine whether a point of interest is changed based on an input image of the second camera, if the point of interest is not changed, to control the first motor to maintain hovering by compensating for a tilt of the electronic device, and, if the point of interest is changed, to control the first motor to maintain hovering by moving to an original position before moving and by compensating for the tilt.

According to an embodiment of the present disclosure, the memory 230 may store one or more programs, data, or instructions that, if compensating for a tilt, cause the processor 210 to control the second motor to control the second camera to maintain horizontality.

The memory 230 may include an extended memory (for example, the external memory 234) or an internal memory (for example, the embedded memory 232). The electronic device 201 may operate in relation to web storage which performs a storage function of the memory 230 on the Internet.

The memory 230 may store one or more pieces of software (or software modules). For example, the software element may include an OS software module, a communication software module, a graphic software module, a UI software module, a moving picture experts group (MPEG) module, a camera software module, or one or more application software modules. In addition, a module which is a software element may be expressed by a set of instructions, and the module may be referred to as an instruction set. The module may also be expressed by a program. According to an embodiment of the present disclosure, the memory 230 may include an additional module (instructions) in addition to the above-described modules. Alternatively, some of the modules (instructions) may not be used when necessary.

The OS software module may include various software elements for controlling a typical system operation. Such controlling of the typical system operation may refer to, for example, managing and controlling a memory, controlling and managing storage hardware (device), or controlling and managing power. In addition, the OS software module may perform a function of facilitating communication between various hardware (devices) and software elements (modules).

The communication software module enables communication with another electronic device, such as a wearable device, a smart phone, a computer, a server, or a mobile terminal, via the communication module 220 or the interface 270. In addition, the communication software module may be configured as a protocol structure corresponding to a corresponding communication method.

The graphic software module may include various software elements for providing and displaying graphics on the display 260. According to an embodiment of the present disclosure, the term "graphics" may be used to indicate a text, a web page, an icon, a digital image, a video, an animation, and the like.

The UI software module may include various software elements related to a UI. For example, the UI software module may include contents regarding how the state of the UI is changed or what condition the state of the changed UI is in.

The MPEG module may include a software module enabling a process and functions (for example, creating, reproducing, distributing, and transmitting a content) related to a digital content (for example, a video, an audio).

The camera software module may include a camera-related software element enabling a process and functions related to a camera.

The application module may include a web browser including a rendering engine, email, instant messaging, word processing, keyboard emulation, an address book, a touch list, a widget, digital rights management (DRM), iris scan, context recognition, voice recognition, a position determining function, a location-based service, and the like. According to an embodiment of the present disclosure, the application module may include instructions to process an operation related to a flight and/or hovering of the electronic device 201.

The sensor module 240 may measure, for example, a physical quantity or may detect an operation state of the electronic device 201, and may convert the measured or detected information to an electrical signal. The sensor module 240 may include at least one of a gesture sensor 240A, a gyro sensor 240B, an atmospheric pressure sensor 240C (e.g., a barometer sensor), a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, or an ultraviolet (UV) light sensor 240M. Additionally or alternatively, the sensor module 240 may include, for example, an electronic node (E-nose) sensor, an electromyography sensor (EMG) sensor, an electroencephalogram (EEG) sensor, an electrocardiogram (ECG) sensor, an infrared (IR) sensor, an iris scan sensor, and/or a fingerprint scan sensor. The sensor module 240 may further include a control circuit for controlling at least one sensor included therein. According to an embodiment of the present disclosure, the electronic device 201 may further include a processor which is a part of the processor 210 or is a separate element from the processor 210 and is configured to control the sensor module 240. The processor may control the sensor module 240 while the processor 210 remains in a reduced power or sleep state.

The input device 250 may include, for example, a touch panel 252, a (digital) pen sensor 254, a key 256, or an ultrasonic input device 258. The touch panel 252 may use at least one of capacitive, resistive, infrared and ultrasonic detecting methods. In addition, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect an ultrasonic wave, which is generated from an input tool, through a microphone 288, and may check data corresponding to the detected ultrasonic wave.

The display 260 (e.g., the display 160) may include a panel 262, a hologram device 264, a projector 266, and/or a control circuit for controlling the aforementioned elements.

The panel 262 may be implemented to be flexible, transparent, or wearable. The panel 262 and the touch panel 252 may be integrated into one or more modules. According to an embodiment of the present disclosure, the panel 262 may include a pressure sensor (or a force sensor) for measuring an intensity of pressure of a user's touch. The pressure sensor may be integrated into the touch panel 252 or may be implemented with one or more sensors separately from the touch panel 252.

The panel 262 may be seated in the display 260, and may sense a user input which touches or approaches the surface of the display 260. The user input may include a touch input or an approach input which is inputted based on at least one of a single touch, a multi-touch, hovering, or an air gesture.

According to an embodiment of the present disclosure, the panel 262 may receive a user input for initiating an operation related to the use of the electronic device 201, and may generate an input signal according to a user input. The panel 262 may be configured to convert a change in a pressure applied to a certain portion of the display 260 or a change in capacitance generated in a certain portion of the display 260 into an electrical input signal. The panel 262 may detect a location and an area of an input tool (for example, a user finger, an electronic pen, and the like) on the surface of the display 260 if the input tool touches or approaches the surface of the display 260. In addition, the panel 262 may be implemented to detect a pressure (for example, a force of a touch) when a touch is inputted in an applied touch method.

The hologram device 264 may display a stereoscopic image in a space using a light interference phenomenon. The projector 266 may project light onto a screen so as to display an image. The screen may be arranged inside or outside of the electronic device 201.

The interface 270 may include, for example, an HDMI 272, a USB 274, an optical interface 276, or a D-subminiature (D-sub) connector 278. The interface 270 may be included, for example, in the communication interface 170 illustrated in FIG. 1. Additionally or alternatively, the interface 270 may include, for example, a mobile high definition link (MHL) interface, an SD card/MMC interface, or an IrDA standard interface.

The interface 270 may receive data from another electronic device or receive power, and may forward data or power to the elements in the electronic device 201. The interface 270 may control internal data of the electronic device 201 to be transmitted to another electronic device. For example, the interface 270 may include an external charger port, a wire/wireless data port, a memory card port, an audio input/output port, a video input/output port, an earphone port, and the like.

The audio module 280 may convert a sound and an electrical signal in dual directions. At least a portion of the audio module 280 may be included, for example, in the input/output interface 145 illustrated in FIG. 1. The audio module 280 may process, for example, sound information that is inputted or outputted through a speaker 282, a receiver 284, an earphone 286, or the microphone 288. The audio module 280 may transmit an audio signal received from the processor 210 to an output device (for example, the speaker 282, the receiver 284, or the earphone 286), and may transmit an audio signal like a voice which is received from the microphone 288 to the processor 210. The audio module 280 may convert voice/audio data into an audible sound and output the audible sound through the output device under control of the processor 210, and may convert an audio signal like a voice received from the input device into a digital signal and transmit the digital signal to the processor 210.

The speaker 282 or the receiver 284 may output audio data which is received from the communication module 220 or stored in the memory 230. The speaker 282 or the receiver 284 may output an audio signal related to various operations (functions) performed in the electronic device 201. The microphone 288 may receive an external audio signal and may process the audio signal into electrical voice data. The microphone 288 may implement various noise reduction algorithms for removing noise occurring in the process of receiving an external audio signal. The microphone 288 may serve to input streaming audio such as a voice command and the like.

The camera module 291 may be, for example, a device for recording a still image or a video, and according to an embodiment of the present disclosure, the camera module 291 may include, for example, at least one image sensor (e.g., a front sensor or a rear sensor), a lens, an ISP, or a flash (e.g., an LED or a xenon lamp).

According to an embodiment of the present disclosure, the camera module 291 may include, for example, a first camera (for example, a color (RGB) camera) for acquiring color information, and a second camera (for example, an infrared camera) for acquiring depth information (for example, location information or distance information of a subject). For example, the first camera (for example, a color camera) may record or take a color image of a subject by converting externally inputted light into an image signal. The camera module 291 may include an image sensor. The image sensor may be implemented by using a charged coupled device (CCD) or a complementary metal-oxide semiconductor (CMOS) device.

According to an embodiment of the present disclosure, the first camera may be a front camera which is provided on the front surface of the electronic device 201. The front camera may be substituted with the second camera and may not be provided on the front surface of the electronic device 201. The first camera may be arranged on the same surface (for example, the front surface) of the electronic device 201 with the second camera. The first camera may be a rear camera which is provided on the other surface (for example, the rear surface) of the electronic device 201. The first camera may include both the front camera and the rear camera which are provided on the front surface and the rear surface of the electronic device 201, respectively.

The power management module 295 may manage, for example, power of the electronic device 201. According to an embodiment of the present disclosure, the power management module 295 may include a power management integrated circuit (PMIC), a charger IC, or a battery gauge.

The PMIC may have a wired charging method and/or a wireless charging method. The wireless charging method may include, for example, a magnetic resonance method, a magnetic induction method or an electromagnetic wave method. The PMIC may further include an additional circuit for wirelessly charging, for example, a coil loop, a resonance circuit, a rectifier, and the like. The battery gauge may measure, for example, a remaining capacity of the battery 296 and a voltage, current or temperature thereof while the battery is being charged. The battery 296 may include, for example, a rechargeable battery or a solar battery.

The indicator 297 may display a certain state of the electronic device 201 or a portion thereof (e.g., a processor 210), such as a booting state, a message state, a charging state, and the like. The motor 298 may convert an electrical signal into a mechanical vibration and may generate vibration, a haptic effect, and the like.

For example, the electronic device 201 may include a mobile TV supporting device (for example, a GPU) for processing media data according to the standards of digital multimedia broadcasting (DMB), digital video broadcasting (DVB), MediaFlo™, and the like.

Each of the elements described in the present disclosure may be configured with one or more components, and the names of the elements may be changed according to the type of the electronic device. According to an embodiment of the present disclosure, some elements of the electronic device (for example, the electronic device 101, 201) may be omitted or other additional elements may be added. Furthermore, some of the elements may be combined so as to form one entity, and the functions of the elements may be performed in the same manner as before being combined.

The term "module" used herein may indicate a unit including hardware, software, or firmware, and, for example, may be used interchangeably with the terms "logic," "logical block," "component" and "circuit". The term "module" may indicate a minimum unit of an integrated component or may be a part thereof. The term "module" may indicate a minimum unit for performing one or more functions or a part thereof. The term "module" may be implemented mechanically or electronically. For example, the term "module" may indicate an application-specific IC (ASIC), a field-programmable gate array (FPGA), and a programmable-logic device for performing some operations, which are known or will be developed.

At least a portion of a device (e.g., modules or functions thereof) or a method (e.g., operations) according to an embodiment of the present disclosure, for example, may be implemented by instructions stored in a non-transient computer-readable storage media (for example, the memory 130, 230) in the form of a programmable module. If the instruction is executed by a processor (e.g., the processor 120, 210), the processor may perform a function corresponding to the instruction.

A non-transitory computer-readable recording media may include a hard disk, a floppy disk, a magnetic media (e.g., a magnetic tape), an optical media (e.g., a compact disc ROM (CD-ROM), a digital versatile disc (DVD), and a magneto-optical media (e.g., a floptical disk)), an internal memory, and the like. In addition, an instruction may include a code generated by a compiler or a code executable by an interpreter. A module or a program module according to an embodiment of the present disclosure may include at least one of the above-described elements, a portion of the above-described elements may be omitted, or additional elements may be included.

Operations performed by a module, a program module, or other elements according to an embodiment of the present disclosure may be executed sequentially, in parallel, repeatedly, or in a heuristic method. In addition, at least a portion of operations may be executed in different sequences, omitted, or other operations may be added.

According to an embodiment of the present disclosure, a recording medium may include a non-transitory computer readable recording medium having a program recorded thereon, for executing various methods which are described below in greater detail at the processor 120, 210.

Hereinafter, a detailed method and an apparatus for maintaining stable hovering of an electronic device which can fly (for example, a UAV, a drone, and the like) (an unmanned electronic device) according to an embodiment of the present disclosure is described.

According to an embodiment of the present disclosure, an unmanned electronic device may include a first camera (for example, the camera module 291) for photographing and a second camera or sensor (for example, an OFS module) for maintaining hovering. In the following descriptions, the second camera is an OFS module. However, the present disclosure is not limited thereto and the second camera may be implemented by using various devices which may be used to maintain hovering of the unmanned electronic device by measuring and identifying a point of interest on the ground like the OFS module. The unmanned electronic device may be configured to always maintain the OFS module horizontally to the ground. The unmanned electronic device may have the OFS module always detect the point of interest on the ground as an input image even if the unmanned electronic device is titled due to an external factor (for example, an external force, wind, and the like) during a hovering operation through the OFS module.

Figure 3A:
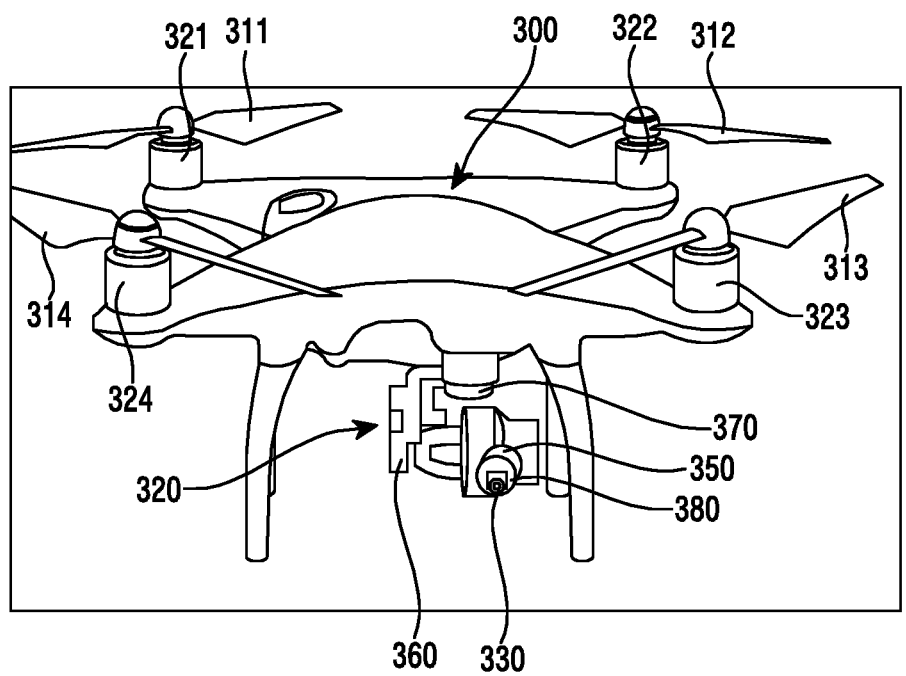
FIGS. 3A and 3B are diagrams showing an example of an unmanned electronic device according to an embodiment of the present disclosure.
Figure 3B:
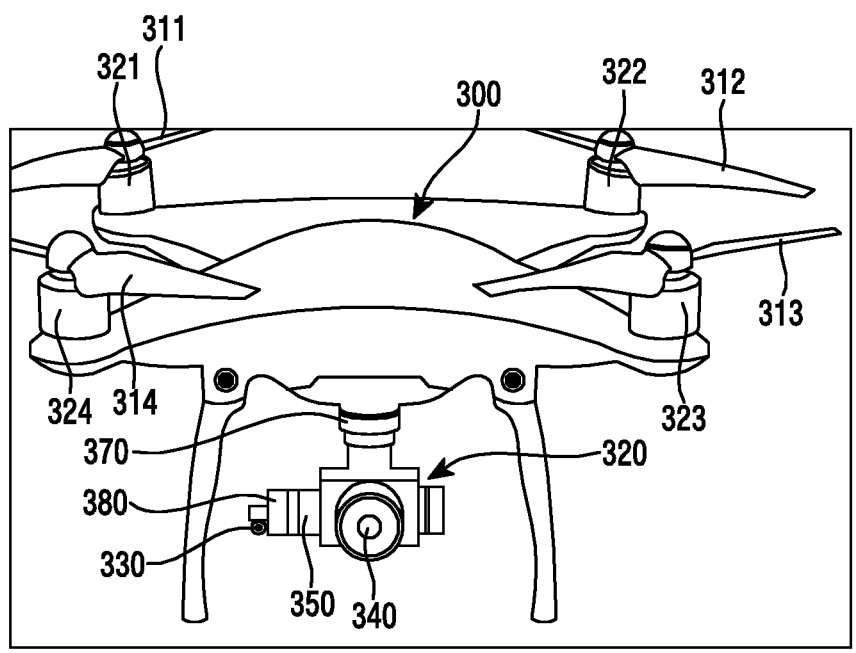

FIGS. 3A and 3B are diagrams of an unmanned electronic device according to an embodiment of the present disclosure.

Referring to FIGS. 3A and 3B, the unmanned electronic device may include an airframe (main body) 300, one or more propellers 311, 312, 313, or 314, and a gimbal 320. According to an embodiment of the present disclosure, FIG. 3A illustrates the unmanned electronic device as viewed from the front, and FIG. 3B illustrates the unmanned electronic device as viewed from the side.

According to an embodiment of the present disclosure, the unmanned electronic device may include one or more propellers 311, 312, 313, and 314. For example, the unmanned electronic device may be implemented by using a single copter or a multicopter (for example, a quadcopter, a tricopter, a hexacopter, or an octocopter). In an embodiment of the present disclosure described below, the unmanned electronic device includes four propellers 311, 312, 313, and 314, but the present disclosure is not limited thereto.

According to an embodiment of the present disclosure, the unmanned electronic device may include a plurality of motors 321, 322, 323, and 324 corresponding to the plurality of propellers 311, 312, 313, and 314, respectively. In the following descriptions, the motors 321, 322, 323, and 324 for controlling or driving the propellers 311, 312, 313, and 314 are referred to as electric motors, but the present disclosure is not limited thereto.

According to an embodiment of the present disclosure, the propellers 311, 312, 313, and 314 and the motors 321, 322, 323, and 324 may be included in a moving module. For example, the moving module may indicate a module related to motion (or flight) of the unmanned electronic device, such as levitation, movement, rotation, hovering, and the like. The unmanned electronic device may be operated to operate the propellers 311, 312, 313, and 314 by means of the electric motors 321, 322, 323, and 324 and to move to a certain set or adjusted position (for example, a photographing position or a target point) and to be fixed at the certain position.

According to an embodiment of the present disclosure, various methods for operating the unmanned electronic device (for example, for operating an aerial power device (for example, the propellers 311, 312, 313, and 314) of the unmanned electronic device) may be implemented. The unmanned electronic device may turn on the unmanned electronic device based on a radio signal (for example, a control signal) received from another electronic device (for example, a smart phone, a remote controller, and the like) wirelessly connected to the unmanned electronic device. Alternatively, the unmanned electronic device may turn on the unmanned electronic device based on sensing information which is inputted from a sensor module of the unmanned electronic device.

The unmanned electronic device may detect a current generated in the electric motors 321, 322, 323, and 324 for driving the propellers 311, 312, 313, and 314, and may operate the propellers 311, 312, 313, and 314 of the unmanned electronic device. For example, the unmanned electronic device may be operated in response to a control signal from another electronic device. According to an embodiment of the present disclosure, the unmanned electronic device may operate the propellers 311, 312, 313, and 314 by driving the electric motors 321, 322, 323, and 324 according to a control signal from another electronic device, and may levitate the airframe 300. The unmanned electronic device may turn on a camera 340 when initiating an operation.

According to an embodiment of the present disclosure, the gimbal 320 may perform a function of maintaining the unmanned electronic device (for example, the airframe 300) upright in spite of a motion of the unmanned electronic device. For example, the gimbal 320 may reduce noise which is generated during flight of the unmanned electronic device (for example, including hovering), and may allow the camera 340 to record or take an image.

According to an embodiment of the present disclosure, the gimbal 320 may include a three-axis gimbal. The gimbal 320 may include a plurality of motors 350, 360, and 370 to maintain the unmanned electronic device (for example, the airframe 300) upright. In the following descriptions, the motors 350, 360, and 370 provided in the gimbal 320 to maintain the airframe 300 upright are referred to as driving motors. For example, the gimbal 320 may be rotated by the first driving motor 350 (for example, a first axis (for example, pitch) driving motor), the second driving motor 360 (for example, a second axis (for example, roll) driving motor), and the third driving motor 370 (for example, a third axis (for example, yaw) driving motor) for maintaining the unmanned electronic device (for example, the airframe 300) upright, and may be maintained upright. However, the present disclosure is not limited thereto, and the gimbal 320 may include gimbals of various structures.

According to an embodiment of the present disclosure, the gimbal 320 may include a first camera (hereinafter, referred to as a camera) 340 for photographing, a second camera (hereinafter, referred to as an OFS module) 330 for maintaining hovering of the unmanned electronic device, and a fourth driving motor 380 (for example, a first axis (pitch) driving motor) for maintaining horizontality of the OFS module 330.

The camera 340 may perform a manual and/or automatic photographing operation at a target position of the unmanned electronic device. The camera 340 may adjust the angle of the camera 340 to make the lens of the camera face a subject based on camera control information. For example, the camera 340 may have a pitch angle (an angle in the vertical direction) adjusted by the first driving motor 350, may have a roll angle (an angle of rotation direction) adjusted by the second driving motor 360, and may have a yaw angle (an angle of right and left direction) adjusted by the third driving motor 370.

The OFS module 330 may include a camera for allowing the unmanned electronic device to be fixed at a set position and to maintain hovering. For example, the OFS module 330 may be designed on an axis linearly extending from a rotation axis (for example, a pitch axis (for example, a pitch axis of the first driving motor 350)) of the camera 340 by a separate driving motor (for example, the fourth driving motor 380). Alternatively, the OFS module 330 may be mounted under the camera 340 in an assembly form.

The fourth driving motor 380 (for example, the first axis (pitch) driving motor) may be included in a horizontality maintaining instrument for always maintaining the OFS module 330 horizontal with respect to the ground. For example, the OFS module 330 may have its angle adjusted by the fourth driving motor 380 even if the airframe 300 of the unmanned electronic device is tilted, such that the OFS module 330 can photograph a point of interest on the ground as an input while maintaining horizontality with respect to the ground. For example, the OFS module 330 may be configured to always face the ground regardless of a tilt of the airframe 300.

According to an embodiment of the present disclosure, the unmanned electronic device may adjust the angle of the camera 340 for photographing a composition by transmitting a control signal for rotating from 0 degrees to −90 degrees (for example, a rotation of −90 degrees) to the first driving motor 350. In this case, the unmanned electronic device may adjust the angle of the OFS module 330 by transmitting a control signal for rotating from −90 degrees to 0 degrees (for example, a rotation of +90 degrees) to the fourth driving motor 380. For example, the unmanned electronic device may change the direction of the camera 340 to be directed toward the ground, and may maintain the direction of the OFS module 330 toward the ground. If the first driving motor 350 is rotated by −90 degrees, the fourth driving motor 380 may be rotated by +90 degrees to maintain an original position of the OFS module 330. Even if the first driving motor 350 related to the pitch axis of the camera 340 is adjusted (rotated), the fourth driving motor 380, which is a driving unit of the OFS module 330, may be independently driven to have the OFS module 330 always face the ground regardless of the rotation of the camera 340.

An operation scenario for controlling the OFS module 330 to maintain hovering in the unmanned electronic device according to an embodiment of the present disclosure is described below in greater detail with reference to the accompanying drawings.

According to an embodiment of the present disclosure, the unmanned electronic device may include a GPS and/or a GLONASS in addition to the above-described elements, and may reach an exact position in the air (sky) by rapidly connecting to a satellite using these elements. The unmanned electronic device may include one or more obstacle detection sensors, and may avoiding an obstacle while flying in response to the obstacle being present in a flight path of the unmanned electronic device.

FIGS. 4A, 4B, 5A, 5B, 6A, and 6B are diagrams of a structure and an operation of an unmanned electronic device according to an embodiment of the present disclosure.

Figure 4A:
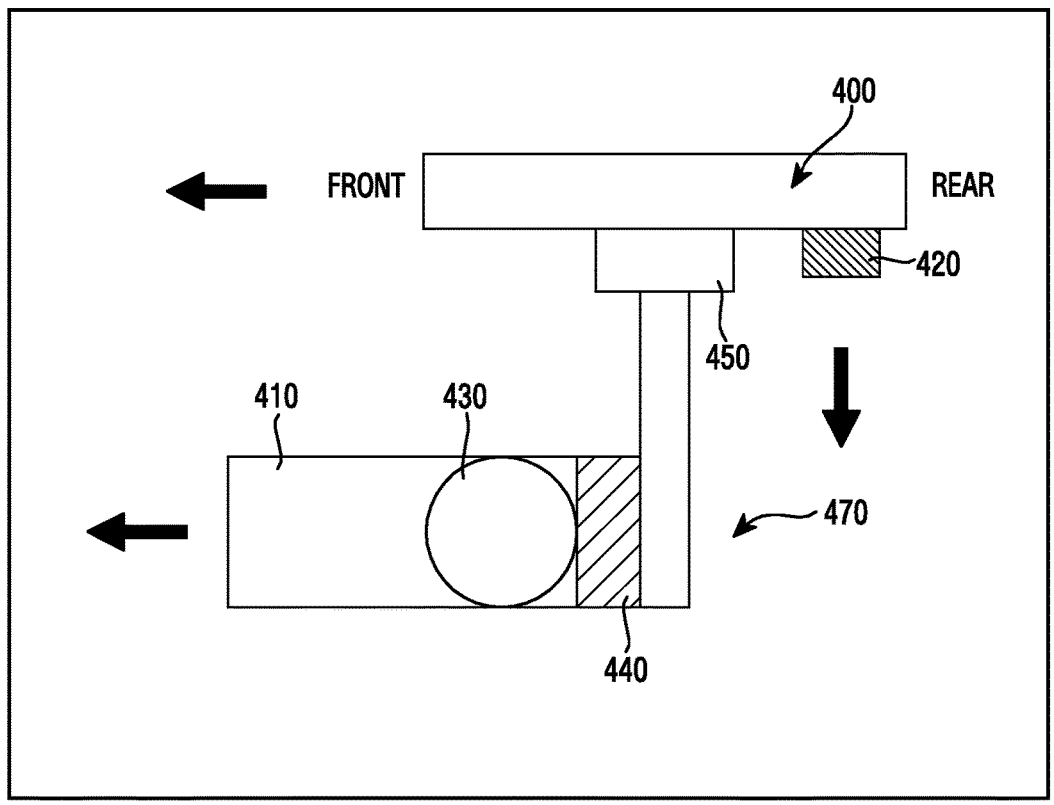
FIGS. 4A, 4B, 5A, 5B, 6A, and 6B are diagrams of structures and operations of an unmanned electronic devices according to an embodiment of the present disclosure.
Figure 4B:
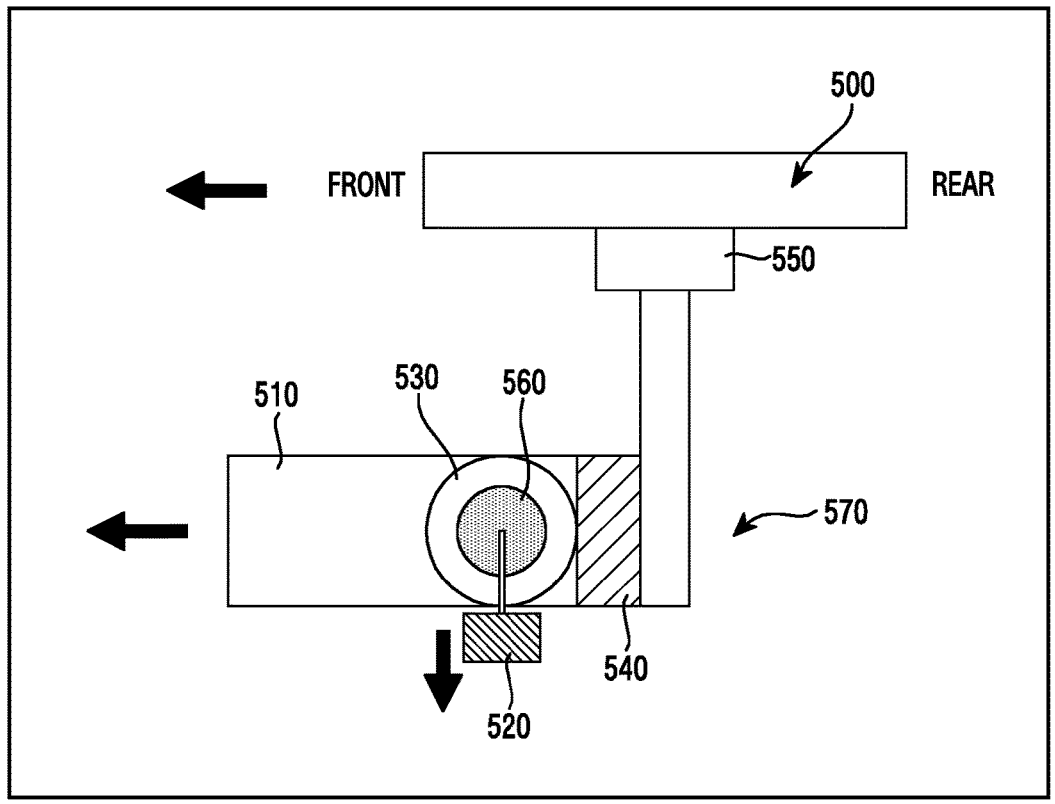
Figure 5A:
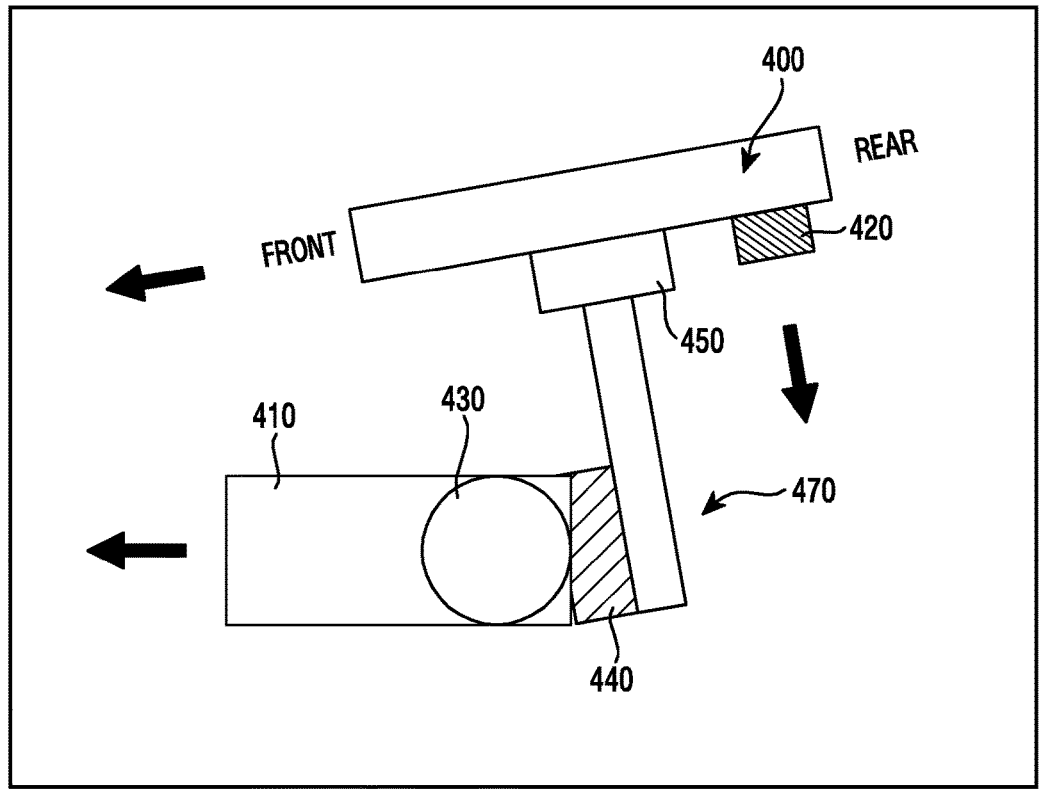
Figure 5B:
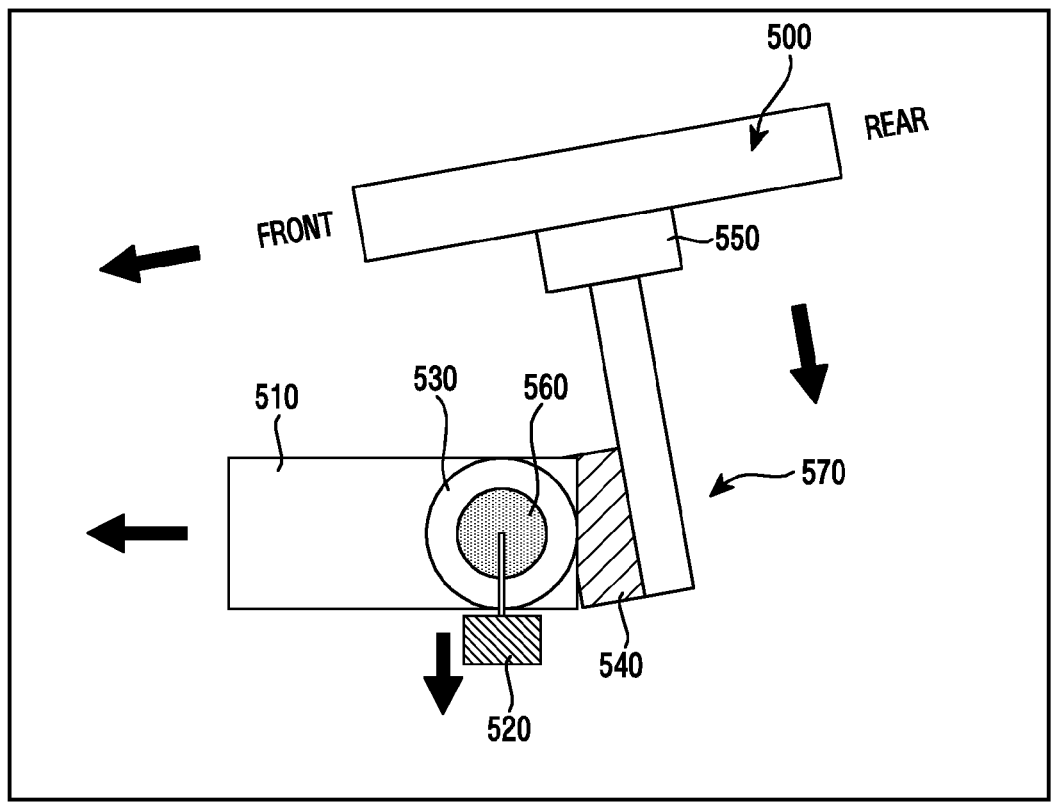
Figure 6A:
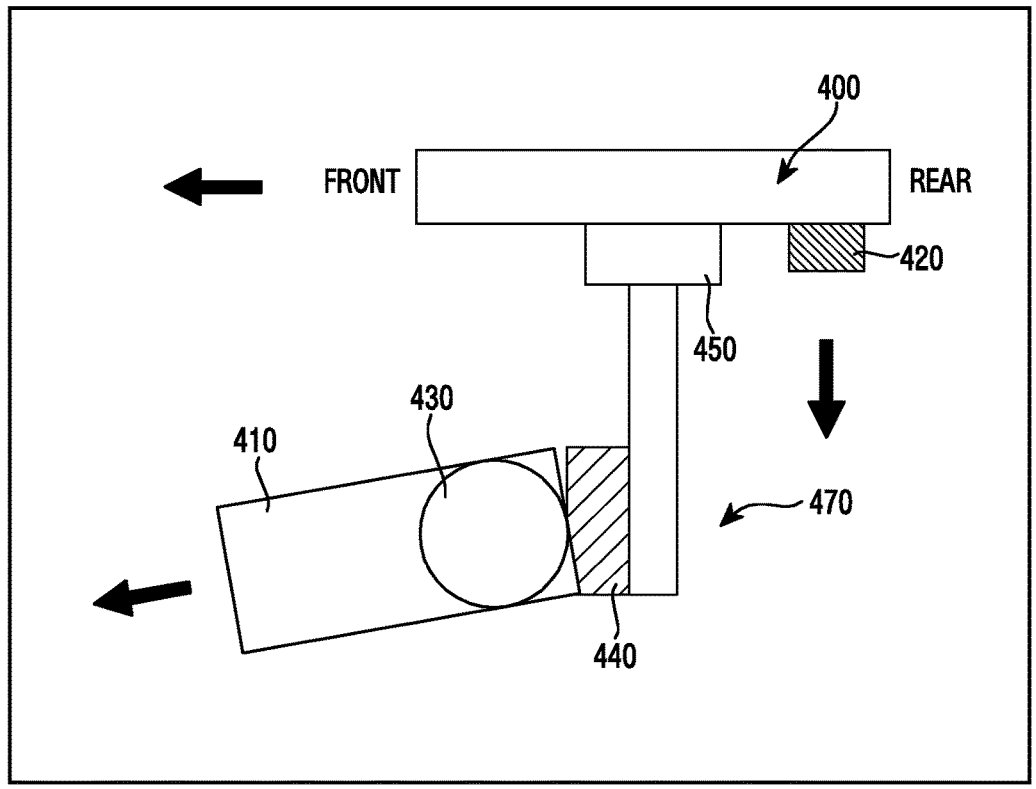
Figure 6B:
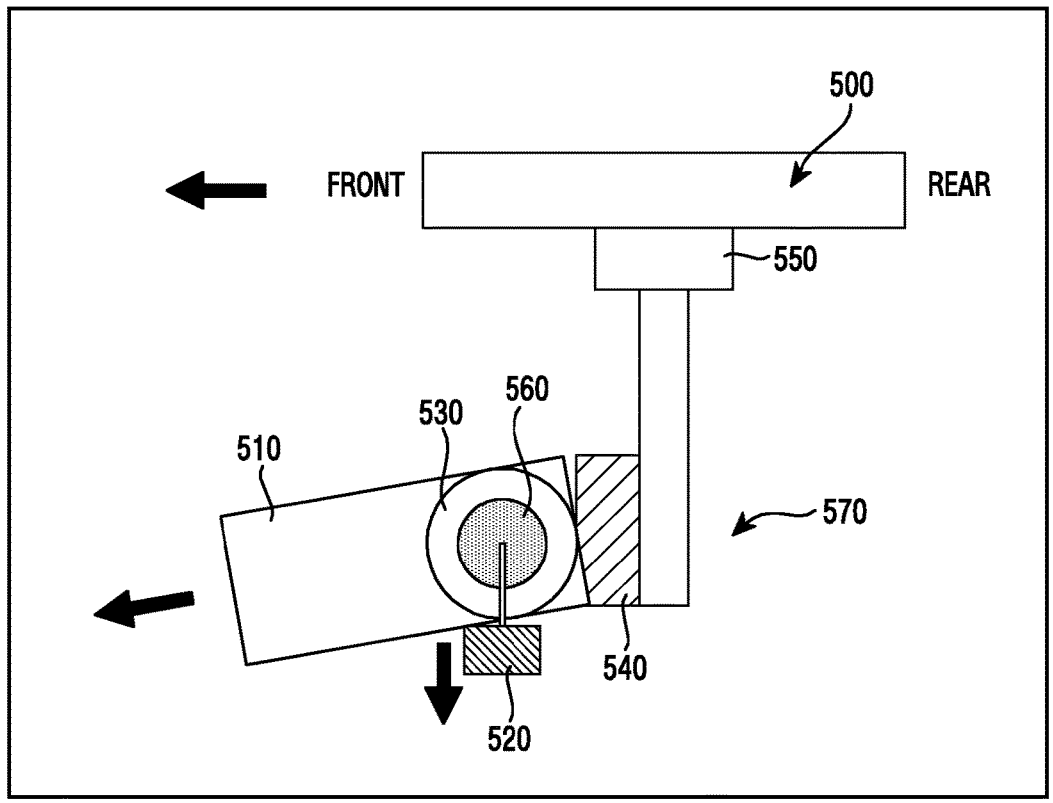

FIGS. 4A and 4B are diagrams that illustrate an operation if the unmanned electronic device is in a hovering state according to an embodiment of the present disclosure. FIGS. 5A and 5B are diagrams that illustrate an operation if the unmanned electronic device is in a flight state. FIGS. 6A and 6B are diagrams that illustrate an operation when the unmanned electronic device adjusts composition for photographing.

FIGS. 4A, 4B, 5A, 5B, 6A, and 6B are provided to facilitate understanding of the present disclosure, FIGS. 4A, 5A, and 6A illustrate an operation of the unmanned electronic device 400 in a conventional method, and FIGS. 4B, 5B, and 6B illustrate an operation of the unmanned electronic device 500 according an embodiment of the present disclosure as compared to the conventional method.

Referring to FIGS. 4A, 5A, and 6A, the unmanned electronic device 400 may have an OFS module 420 mounted on a certain region (for example, a bottom surface of an airframe) of a lower surface of the unmanned electronic device 400, and the unmanned electronic device 400 and the OFS module 420 may be electrically connected to each other. A gimbal 470 may be coupled to a certain region (for example, the center of the bottom surface of the air frame) of the lower surface of the unmanned electronic device 400. The gimbal 470 may include a camera 410 for photographing and a first driving motor 430, a second driving motor 440, and a third driving motor 450 for adjusting (rotating) the camera 410 (or the gimbal 470) in a direction corresponding to a photographing composition adjustment of the camera 410.

Referring to FIGS. 4B, 5B, and 6B, the unmanned electronic device 500 according to an embodiment of the present disclosure may have an OFS module 520 formed on a certain side surface of a gimbal 570 rather than on a lower surface of the unmanned electronic device 500. For example, the OFS module 520 may be designed to work with a camera 510. The gimbal 570 may be coupled to a certain region (for example, the center of the bottom surface of the air frame) of the lower surface of the unmanned electronic device 500. The gimbal 570 may include the camera 510 for photographing and a first driving motor 530, a second driving motor 540, and a third driving motor 550 for adjusting (rotating) the camera 510 (or the gimbal 570) in a direction corresponding to a photographing composition adjustment of the camera 510. The gimbal 570 may further include the OFS module 520 and a fourth driving motor 560 for maintaining horizontality of the OFS module 520 so as to make the OFS module 520 always face the ground.

As shown in FIG. 4A, if the unmanned electronic device 400 is in the hovering state while maintaining horizontality according to the conventional method, the OFS module 420 may face the ground. For example, as shown in Table 1 below, the unmanned electronic device 400 may be in the direction of 0 degrees, the camera 410 may be in the direction of 0 degrees, the OFS module 420 may be in the direction of −90 degrees, and, accordingly, the first driving motor 430, the second driving motor 440, and the third driving motor 450 may also have a driving angle of 0 degrees.

TABLE 1

| Elements | Direction (State) | Elements | Direction (Driving angle) |
| --- | --- | --- | --- |
| Airframe | 0 degrees | First direction driving motor | 0 degrees |
| Camera | 0 degrees | Second direction driving motor | 0 degrees |
| OFS module | −90 degrees | Third direction driving motor | 0 degrees |

As shown in FIG. 4B, if the unmanned electronic device 500 according to an embodiment of the present disclosure is in the hovering state while maintaining horizontality, the OFS module 520 may face the ground. For example, as shown in Table 2 below, the unmanned electronic device 500 may be in the direction of 0 degrees, the camera 510 may be in the direction of 0 degrees, the OFS module 520 may be in the direction of −90 degrees, and, accordingly, the first driving motor 530, the second driving motor 540, the third driving motor 550, and the fourth driving motor 560 may also have a driving angle of 0 degrees.

TABLE 2

| Elements | Direction (State) | Elements (motors) | Direction (Driving angle) |
|---|---|---|---|
| Airframe | 0 degrees | First direction driving motor | 0 degrees |
| Camera | 0 degrees | Second direction driving motor | 0 degrees |
| OFS module | −90 degrees | Third direction driving motor | 0 degrees |
| | | Fourth direction driving motor | 0 degrees |

As shown in FIGS. 5A and 5B, the unmanned electronic device 400, 500 may have its front surface titled downward in a flight state (for example, a forward flight).

In this case, the OFS module 420 and the gimbal 470 of the unmanned electronic device 400 according to the conventional method may be tilted according to the tilt of the unmanned electronic device 400. If the angle of the gimbal 470 is changed, the first driving motor 430 may be rotated by a driving angle (for example, +20 degrees) corresponding to a tilt angle (for example, −20 degrees) of the camera 410 in the opposite direction (reverse direction) to the tilt of the gimbal 470 in order to maintain horizontality of the camera 410. This example is illustrated in Table 3 below:

TABLE 3

| Elements | Direction (State) | Elements | Direction (Driving angle) |
|---|---|---|---|
| Airframe | −20 degrees | First direction driving motor | +20 degrees |
| Camera | 0 degrees | Second direction driving motor | 0 degrees |
| OFS module | −110 degrees | Third direction driving motor | 0 degrees |

On the other hand, in the case of the unmanned electronic device 500 according to an embodiment of the present disclosure, only the gimbal 570 may be titled according to the tilt of the unmanned electronic device 500, and the camera 510 and the OFS module 520 provided in the gimbal 570 may maintain horizontality. The first driving motor 530 may be rotated by a driving angle (for example, +20 degrees) corresponding to a tilt angle (for example, −20 degrees) of the camera 510 in the opposite direction (reverse direction) to the tilt of the gimbal 570, such that the camera 510 and the OFS module 520 formed at the first driving motor 530 can maintain horizontality. This example is illustrated in Table 4 below. For example, the unmanned electronic device 500 may have the OFS module 520 provided on the gimbal 570 and may maintain horizontality of the OFS module 520 even if the unmanned electronic device 500 is titled during a flight, and may exactly photograph and identify a change in a point of interest on the ground.

TABLE 4

| Elements | Direction (State) | Elements | Direction (Driving angle) |
|---|---|---|---|
| Airframe | −20 degrees | First direction driving motor | +20 degrees |
| Camera | 0 degrees | Second direction driving motor | 0 degrees |
| OFS module | −90 degrees | Third direction driving motor | 0 degrees |

TABLE 4-continued

| Elements | Direction (State) | Elements | Direction (Driving angle) |
|---|---|---|---|
| | | Fourth direction driving motor | 0 degrees |

As shown in FIGS. 6A and 6B, the unmanned electronic device 400, 500 may change the direction of the camera 410, 510 according to a user's operation on a photographing composition. For example, a user may operate to change the photographing composition of the camera 410, 510 by operating another electronic device (for example, a smart phone, a tablet PC, a remote controller, and the like) with which communication of the unmanned electronic device 400, 500 is established. Another electronic device may transmit a control signal for controlling the camera 410, 510 to the unmanned electronic device 400, 500 in response to a user's operation, and the unmanned electronic device 400, 500 may adjust (or change) the direction of the camera 410, 510 to correspond to a corresponding composition in response to the control signal. Alternatively, the unmanned electronic device 400, 500 may automatically adjust (or change) the camera 410, 510 at a certain set position for the sake of a set photographing composition.

In this case, the unmanned electronic device 400 according to the conventional method may be in a state in which the unmanned electronic device 400 is in the direction of 0 degrees, the camera 410 is in the direction of −20 degrees, and the OFS module 420 is in the direction of −90 degrees, while maintaining horizontality, as shown in Table 5 below. Accordingly, the unmanned electronic device 400 may be in a state in which the first driving motor 430 has a driving angle of −20 degrees, the second driving motor 440 has a driving angle of 0 degrees, and the third driving motor 450 has a driving angle of 0 degrees.

TABLE 5

| Elements | Direction (State) | Elements | Direction (Driving angle) |
|---|---|---|---|
| Airframe | 0 degrees | First direction driving motor | −20 degrees |
| Camera | −20 degrees | Second direction driving motor | 0 degrees |
| OFS module | −90 degrees | Third direction driving motor | 0 degrees |

On the other hand, in the case of the unmanned electronic device 500 according to an embodiment of the present disclosure, the fourth driving motor 560 may maintain horizontality of the OFS module 520 by being rotated by a driving angle (a reverse driving angle (for example, +20 degrees)) corresponding to the rotation angle (a driving angle (for example, −20 degrees) of the first driving motor 530) in the opposite direction (reverse direction) to the rotation of the camera 510 (for example, the rotation of the first driving motor 530). This example is illustrated in Table 6 below. For example, the unmanned electronic device 500 may have the OFS module 520 formed on the gimbal 570, and may include a horizontality maintaining instrument (for example, the fourth driving motor 560) for maintaining horizontality of the OFS module 520, such that the horizontality of the OFS module 520 can be maintained even when the unmanned electronic device 500 is titled during a flight, a photographing operation, or hovering of the unmanned electronic device 500, and the OFS module 520 can exactly photograph and identify a change in the point of interest on the ground.

TABLE 6

| Elements | Direction (State) | Elements (motors) | Direction (Driving angle) |
|---|---|---|---|
| Airframe | 0 degrees | First direction driving motor | −20 degrees |
| Camera | −20 degrees | Second direction driving motor | 0 degrees |
| OFS module | −90 degrees | Third direction driving motor | 0 degrees |
| | | Fourth direction driving motor | +20 degrees |

Figure 7:
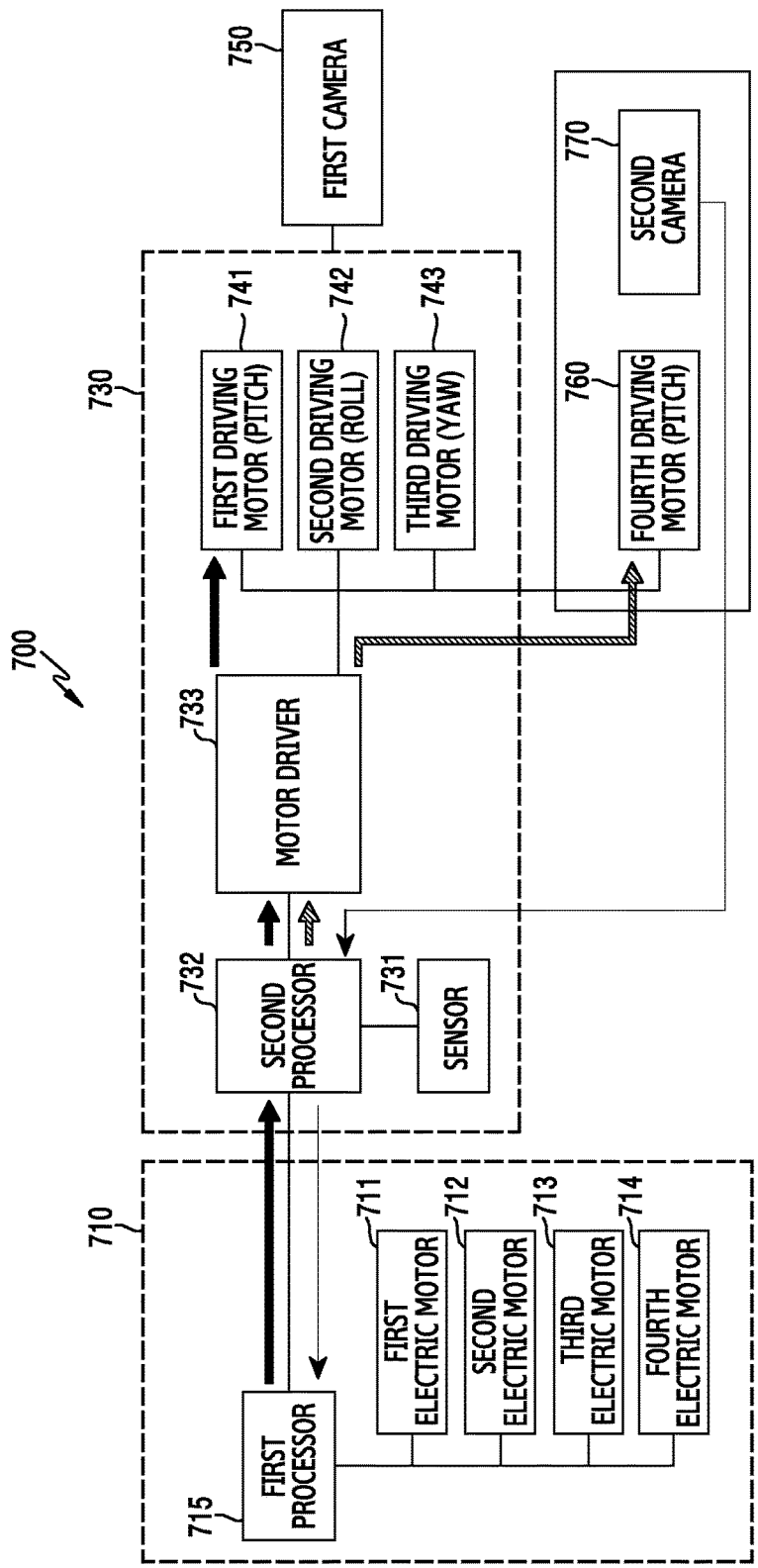
FIG. 7 is a block diagram of an unmanned electronic device according to an embodiment of the present disclosure.

FIG. 7 is a block diagram of an unmanned electronic device according to an embodiment of the present disclosure.

Referring to FIG. 7, the unmanned electronic device 700 may include, for example, an airframe (main body) 710, a gimbal 730, a first camera 750 (hereinafter, referred to as a camera 750), and a second camera 770 (hereinafter, referred to as an OFS module 770). The elements of the unmanned electronic device 700 shown in FIG. 7 are not essential, and the unmanned electronic device 700 may be implemented to include more elements (for example, a propeller, an obstacle detection sensor, an altitude sensor, a communication module, a memory, a GPS module, and the like) or fewer elements than the elements shown in FIG. 7.

According to an embodiment of the present disclosure, the airframe 710 may include a first processor (for example, an AP) 715, a first electric motor 711, a second electric motor 712, a third electric motor 713, and a fourth electric motor 714. The unmanned electronic device 710 may be configured to include four propellers (for example, the propellers 311, 312, 313, and 314 shown in FIG. 3), for example. The unmanned electronic device 710 may include the electric motors 711, 712, 713, and 714 corresponding to the propellers 311, 312, 313, and 314, respectively, to drive the propellers 311, 312, 313, and 314.

The first processor 715 may output control data to rotate the propellers 311, 312, 313, and 314. For example, the first processor 715 may convert motor control data corresponding to an output for adjusting each propeller 311, 312, 313, or 314 into a driving signal based on photographing position information or flight path information, and may output the driving signal to the electric motors 711, 712, 713, or 714.

According to an embodiment of the present disclosure, the first processor 715 may process an operation related to a flight of the unmanned electronic device 700, such as levitation, movement, rotation, hovering, photographing, and the like of the unmanned electronic device 700. The first processor 710 may control a flight function based on a control signal received from another electronic device (for example, a smart phone, a tablet PC, a remote controller, and the like) with which wireless communication is established, or may automatically control the flight function based on setting information set in a memory. The first processor 715 may be operated to operate the propellers 311, 312, 313, and 314 and allow the unmanned electronic device 700 to move to a certain set or adjusted position (for example, a photographing position or a target point) and to be fixed at the position.

According to an embodiment of the present disclosure, various methods for operating the unmanned electronic device 700 (for example, an aerial power device (for example, the propellers 311, 312, 313, and 314) of the unmanned electronic device 700) may be implemented. The first processor 715 may turn on the unmanned electronic device 700 based on a radio signal (for example, a control signal) received from another electronic device wirelessly connected to the unmanned electronic device 700. Alternatively, the first processor 715 may turn on the unmanned electronic device 700 based on sensing information inputted from a sensor module of the unmanned electronic device 700.

The first processor 715 may detect currents generated from the electric motors 711, 712, 713, and 714 for driving the propellers 311, 312, 313, and 314, and may operate the propellers 311, 312, 313, and 314 of the unmanned electronic device 700. For example, the first processor 715 may be operated in response to a control signal from another electronic device. According to an embodiment of the present disclosure, the first processor 715 may control the flight of the unmanned electronic device 700 by operating the propellers 311, 312, 313, and 314 by driving the electric motors 711, 712, 713, and 714 according to the control signal from another electronic device.

The first processor 715 may control to turn on the camera 750 and the OFS module 770 when initiating the operation of the unmanned electronic device 700.

According to an embodiment of the present disclosure, the first processor 715 may process an operation related to photographing by the unmanned electronic device 700. For example, the first processor 715 may process an operation related to taking an image as intended by a user. For example, the first processor 715 may receive a control signal related to control of the camera 750 from another electronic device with which wireless communication is established, and may control the photographing function by adjusting the camera 750 (for example, by adjusting a pitch axis rotation) based on the received control signal.

According to an embodiment of the present disclosure, the first processor 715 may process an operation related to control of the OFS module 770. For example, the processor 715 may determine a change in an angle of the unmanned electronic device 700 or the camera 750. If a change in the angle is detected, the first processor 715 may control the OFS module 770 to fixedly maintain horizontality with respect to the ground in response to the changed angle. The processing (or control) operation of the first processor 715 is described below in greater detail with reference to the accompanying drawings.

The first electric motor 711, the second electric motor 712, the third electric motor 713, and the fourth electric motor 714 may control the rotation of the corresponding propellers 311, 312, 313, and 314 based on corresponding driving signals, respectively.

According to an embodiment of the present disclosure, the gimbal 730 may include a sensor 731, a second processor 732, a motor driver 733, a first driving motor 741 (for example, a pitch driving motor), a second driving motor 742 (for example, a roll driving motor), a third driving motor 743 (for example, a yaw driving motor), the first camera 750 (hereinafter, a camera), a fourth driving motor 760 (for example, a pitch driving motor), and the second camera (hereinafter, the OFS module) 770.

According to an embodiment of the present disclosure, the gimbal 730 may be mounted in the airframe 710 of the unmanned electronic device 700. The gimbal 730 may be installed in a mounting recess (or a coupling member) formed on the airframe 710 to have the camera 750 fixedly mounted on the outside surface thereof. For example, the gimbal 730 may be connected to the airframe 710 of the unmanned electronic device 700 by means of a support shaft installed through the air frame 710. The gimbal 730 may have one end rotatably connected to the air frame 710 and may have the camera 750 rotatably connected to the other end thereof (for example, the outside surface). The gimbal 730 may connect the OFS module 770 to be rotated opposite (in an opposite direction) to the rotation of the camera 750.

The sensor 731 may include, for example, a nine-axis sensor. According to an embodiment of the present disclosure, the sensor 731 may include an acceleration sensor and a gyro sensor. The camera 750 may be influenced by a motion of the unmanned electronic device 700. The gimbal 730 may maintain the camera 750 at a constant angle (for example, horizontal) regardless of a motion of the unmanned electronic device 700, such that a stable image can be obtained.

For example, referring to the operation of the gimbal 730, the second processor 732 may identify a motion of the unmanned electronic device 700 by analyzing a measurement value of the sensor 731 (for example, the gyro sensor and the acceleration sensor). The second processor 732 may generate compensation data according to a motion of the unmanned electronic device 700. For example, the compensation data may be data for controlling at least a part of roll (for example, a rotation on an x-axis), pitch (for example, a rotation on a y-axis), or yaw (for example, a rotation on a z-axis) of the camera 750. According to an embodiment of the present disclosure, the gimbal 730 may transmit roll compensation data to the motor driver 733, and the motor driver 733 may convert the roll compensation data into a motor driving signal and transmit the motor driving signal to the roll driving motor (for example, the second driving motor 742). The gimbal 730 may transmit pitch compensation data to the motor driver 733, and the motor driver 733 may convert the pitch compensation data into a motor driving signal and may transmit the motor driving signal to the pitch driving motor (for example, the first driving motor 741).

The second processor 732 may include, for example, a micro controller unit (MCU) or a microprocessor unit (MPU). According to an embodiment of the present disclosure, the second processor 732 may control an operation related to posture maintenance of the gimbal 730 based on sensor information (for example, a posture measurement value) of the sensor 731. For example, as described above, the second processor 732 may generate compensation data according to a motion of the unmanned electronic device 700 by analyzing a measurement value of the sensor 731. The second processor 732 may control at least a part of the rotation of the gimbal 730 on the x-axis, the rotation on the y-axis, and/or the rotation on the z-axis based on the compensation data. For example, the second processor 732 may transmit the compensation data to the motor driver 733, and the motor driver 733 may convert the compensation data into a motor driving signal corresponding to the compensation data and may transmit the motor driving signal to the corresponding driving motors 741, 742, 743, and 760.

According to an embodiment of the present disclosure, the second processor 732 may determine a change in the angle of at least one of the unmanned electronic device 700, the gimbal 730, or the camera 750 based on sensor information of the sensor 731, and may control an operation related to posture maintenance of the OFS module 770 in response to the change in the angle. The second processor 732 may adjust the first driving motor 741, the second driving motor 742, the third driving motor 743, and the fourth driving motor 760 through sensor information of the sensor 731. The second processor 732 may adjust the first driving motor 741, the second driving motor 742, and the third driving motor 743 to allow the camera 750 to face in a certain direction, and may adjust the fourth driving motor 760 to allow the OFS module 770 to face the ground, for example, to maintain horizontality.

The second processor 732 may transmit compensation data to the motor driver 733, and the motor driver 733 may convert the compensation data into a motor driving signal corresponding to the compensation data and may transmit the motor driving signal to the fourth driving motor 760.

For example, if a change in the angle of the airframe 710 of the unmanned electronic device 700 is detected, the second processor 732 may maintain horizontality of the OFS module 770 in response to the horizontality of the gimbal 730 being maintained. According to an embodiment of the present disclosure, as in the example shown in FIG. 5B, the second processor 732 may maintain the postures of the camera 750 and the OFS module 770 by rotating the second driving motor 742 according to the compensation data.

For example, as in the example shown in FIG. 6B, if a change in the angle of the camera 750 is detected, the second processor 732 may maintain horizontality of the OFS module 770 by controlling the fourth driving motor 760 to rotate by a driving angle corresponding to a rotation angle (for example, a driving angle of the first driving motor 741) of the camera 750 in the opposite direction (reverse direction) to the rotation of the camera 750 (for example, the rotation of the first driving motor 741). According to an embodiment of the present disclosure, the second processor 732 may transmit pitch compensation data to the motor driver 733, and the motor driver 733 may convert the pitch compensation data into a motor driving signal and may transmit the motor driving signal to the fourth driving motor 760. For example, the second processor 732 may stabilize the OFS module 770 in an upright state by offsetting the rotation (for example, pitch) of the camera 760.

According to an embodiment of the present disclosure, if the user adjusts the rotation on the pitch axis to change a composition of the camera 750 using another electronic device, a pitch angle control signal may be transmitted to the second processor 732 of the gimbal 730 through the first processor 715. The second processor 732 may identify sensor information of the sensor 731 and may adjust the pitch angle of the camera 750 using the first driving motor 741 based on at least a part of the control signal and the sensor information. Herein, the second processor 732 may adjust the pitch angle using the fourth driving motor 760 so as to allow the OFS module 770 to face the ground (e.g., the OFS module 770 maintains horizontality) without being influenced by a change in the pitch angle of the camera 750.

According to an embodiment of the present disclosure, the second processor 732 may receive an input image from the OFS module 770, and may determine whether a point of interest on the ground is changed based on the received input image.

The motor driver 733 may include, for example, a motor driver IC. The motor driver 733 may convert motor control data (for example, compensation data) outputted from the second processor 732 into a driving signal, and may output the driving signal. For example, the motor driver 733 may convert the motor control data into a driving signal corresponding to at least one of the first driving motor 741, the second driving motor 742, the third driving motor 743, or the fourth driving motor 760, and may output the driving signal to the corresponding driving motor 741, 742, 743, or 760.

The first driving motor 741, the second driving motor 742, and the third driving motor 743 may rotate the camera 750 on the x-axis, the y-axis, or the z-axis (for example, roll, pitch, and yaw) according to a motion of the gimbal 730 based on corresponding driving signals, respectively.

The camera 750 may include, for example, the camera module 291 of FIG. 2. The camera 750 may perform a photographing operation in a photographing mode. The camera 750 may adjust composition with a subject and/or a camera angle (photographing angle) by adjusting an angle of a camera lens vertically and horizontally based on composition information and/or camera control information outputted from the first processor 715 (or the second processor 732). The camera 750 may be influenced by a motion of the unmanned electronic device 700. The gimbal 730 may support the camera 750 to record or take a stable image by maintaining the camera 750 at a constant angle (for example, horizontal) regardless of a motion of the unmanned electronic device 700.

The fourth driving motor 760 may be rotated according to a motion (a change in the angle) of the unmanned electronic device 700, the gimbal 730, or the camera 750 based on a driving signal of the motor driver 733, so as to maintain the OFS module 770 at a constant angle (for example, horizontal or at −90 degrees) regardless of the change in the angle. According to an embodiment of the present disclosure, the fourth driving motor 760 may compensate for pitch according to the change in the angle. For example, the fourth driving motor 760 may stabilize the OFS module 770 in the upright state by offsetting the rotation (for example, pitch) of the first driving motor 741. The fourth driving motor 760 may be configured independently on an axis linearly extending from the pitch axis of the first driving motor 741.

The OFS module 770 may include, for example, the camera module 291 of FIG. 2. The OFS module 770 may be maintained at a constant angle (for example, horizontal, at −90 degrees) regardless of a motion of the unmanned electronic device 700, such that it can record or take a stable image (for example, a point of interest). For example, the OFS module 770 may be maintained at an angle horizontal to the ground (for example, −90 degrees) by the fourth driving motor 760 regardless of a change in the angle. The OFS module 770 may photograph a point of interest on the ground as an input image while being maintained horizontally to the ground, and may transmit the input image to the second processor 732.

As described above, an electronic device according to an embodiment of the present disclosure may include a gimbal; a first camera configured to record or take an image; a second camera configured to detect a point of interest on the ground as an input image; at least one sensor configured to detect a motion of the electronic device; a first motor configured to generate a thrust related to a flight of the electronic device; a second motor configured to drive the first camera and the second camera to maintain horizontality; and at least one processor electrically connected to the first camera, the second camera, the at least one sensor, the first motor, and the second motor. The at least one processor may be configured to detect a change of angle of the electronic device by the sensor during a hovering operation of the electronic device; control the second motor to control the second camera to maintain horizontality in response to the change in angle; determine whether the point of interest is changed based on an input image of the second camera; if the point of interest is not changed, control the first motor to maintain hovering by compensating for a tilt of the electronic device; and, if the point of interest is changed, control the first motor to maintain hovering by moving to an original position before moving and by compensating for the tilt, and, if compensating for the tilt, the at least one processor may be configured to control the second motor to control the second camera to maintain horizontality.

According to an embodiment of the present disclosure, the second camera may include an OFS module.

According to an embodiment of the present disclosure, the first motor may include an electric motor for operating a propeller provided in the electronic device, and the second motor may include a driving motor for maintaining the electronic device upright regardless of a motion of the electronic device.

According to an embodiment of the present disclosure, the driving motor may include a first driving motor configured to maintain horizontality of the first camera and to adjust a rotation angle of the first camera in response to control of the first camera; and a second driving motor configured to maintain horizontality of the second camera, wherein the second driving motor may be formed at a position linearly extending from a rotation axis of the first driving motor.

According to an embodiment of the present disclosure, if the first camera is rotated using the first driving motor, the processor may be configured to offset the rotation of the second camera as much as the rotation of the first camera using the second driving motor.

According to an embodiment of the present disclosure, if the first driving motor is adjusted to rotate the first camera, the processor may be configured to maintain horizontality of the second camera by rotating the second driving motor by an angle corresponding to the rotation of the first driving motor in an opposite direction to the rotation of the first driving motor.

According to an embodiment of the present disclosure, the processor may be configured to detect a change in an angle and a change in a reference position of the electronic device; track a reference point of interest in response to detecting the change in the reference position; determine a movement position of the electronic device based on a result of tracking the reference point of interest; determine a thrust corresponding to the determined movement position and control the electric motor based on the determined thrust; operate a propeller based on the electric motor and move the electronic device to the determined movement position; and, if the electronic device reaches the determined movement position, compensate for the changed angle by controlling the driving motor and then maintain hovering.

According to an embodiment of the present disclosure, the processor may be configured to identify the reference point of interest based on an input image of the second camera, and determine whether a position of the electronic device is changed based on the reference point of interest.

According to an embodiment of the present disclosure, the processor may be configured to control the first driving motor to maintain the first camera in a certain direction based on sensor information of the sensor during the flight operation of the electronic device; control the second driving motor to maintain horizontality of the second camera during the flight operation of the electronic device; if control of the first camera is detected, control the first driving motor to control a pitch axis rotation of the first camera; and control the second driving motor to maintain horizontality of the second camera opposite to the pitch axis rotation of the first camera.

According to an embodiment of the present disclosure, the processor may be configured to generate a control signal for controlling a pitch angle of the first camera; identify sensor information of the sensor; control the first driving motor for the first camera based on at least a part of the control signal and the sensor information; generate compensation data of the second driving motor for the second camera opposite to a rotation of the first driving motor; and, based on the compensation data, control the second driving motor to rotate in an opposite direction to a rotation direction of the first driving motor, wherein the compensation data may be set as an opposite rotation angle corresponding to a rotation angle of the first driving motor to offset the rotation of the first driving motor.

According to an embodiment of the present disclosure, the processor may include a first processor configured to process an operation related to the flight of the electronic device; and a second processor configured to maintain the first camera and the second camera upright by the gimbal.

Hereinafter, a method and an apparatus according to various embodiments of the present disclosure are described with reference to the accompanying drawings. However, since the present disclosure is not intended to be limited by the following descriptions, it should be noted that the present disclosure may be applied to various embodiments based on the following descriptions. In various embodiments of the present disclosure described below, a hardware level approach is described by way of an example. However, since various embodiments of the present disclosure include technology which use both hardware and software, various embodiments of the present disclosure do not exclude a software-based approach.

A processor for controlling the operation of the unmanned electronic device is the processor 210 shown in FIG. 2, but the present disclosure is not limited thereto. For example, according to an embodiment of the present disclosure, the processor may include one or more processors (for example, the first processor 715 and the second processor 732 of FIG. 7) and may control various operations. The first processor 715 may process an operation related to a flight of the unmanned electronic device, and the second processor 732 may process an operation related to maintaining, by the gimbal 730, the upright state of the camera 750 and the OFS module 770. The first processor 715 may include a function of the second processor 732.

Figure 8:
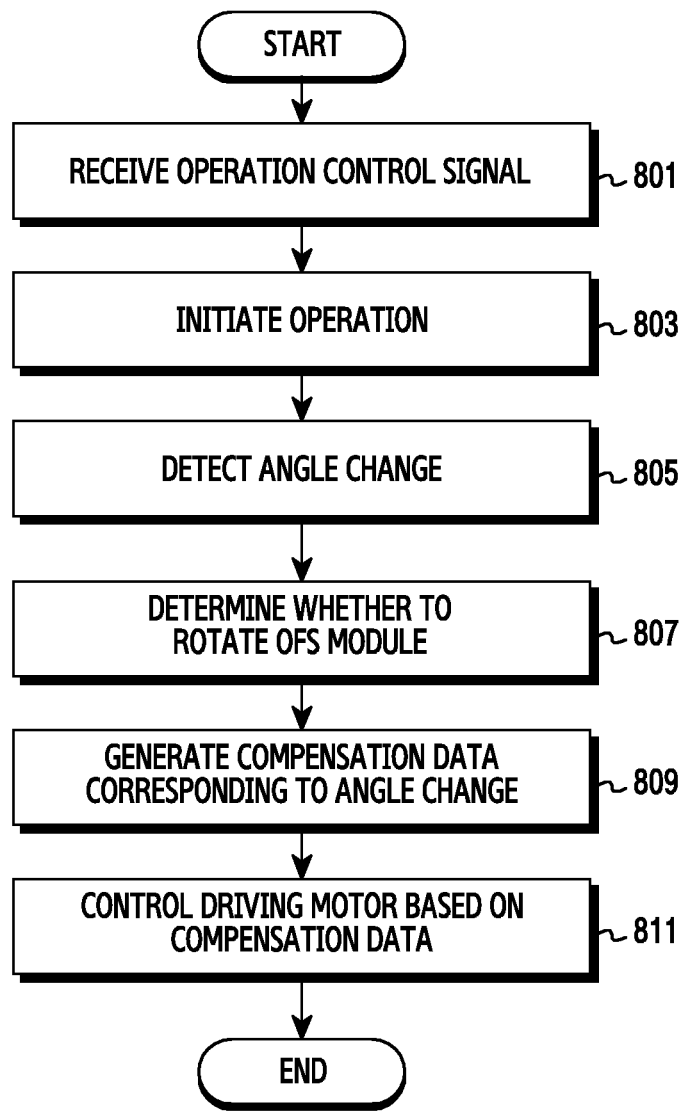
FIG. 8 is a flowchart of a method of operating an unmanned electronic device according to an embodiment of the present disclosure.

FIG. 8 is a flowchart of a method of operating the unmanned electronic device according to an embodiment of the present disclosure.

Referring to FIG. 8, in step 801, the processor 210 may receive an operation control signal from another electronic device (for example, a smart phone, a tablet PC, a remote controller, and the like). According to an embodiment of the present disclosure, the unmanned electronic device may be connected (paired) with another electronic device based on wireless communication or may perform a connecting operation upon receiving a connection request. The unmanned electronic device may detect the operation control signal being received in a standby state in which it can receive signals from another electronic device.

In step 803, the processor 210 may control to initiate an operation of the unmanned electronic device in response to the operation control signal. For example, the processor 210 may process an operation related to a flight of the unmanned electronic device such as taking off (for example, vertically ascending or moving to a predetermined position and height), halting (for example, hovering), and moving. According to an embodiment of the present disclosure, the processor 210 may drive (for example, turn on) the camera 750 and the OFS module 770 in parallel or in sequence at the time of connecting (for example, pairing) with another electronic device or receiving the operation control signal. The camera 750 and the OFS module 770 may be turned on under control of the user.

In step 805, the processor 210 may detect a change in an angle during a flight of the unmanned electronic device. For example, the processor 210 may detect the angle of the unmanned electronic device or the camera 750 being changed as described above.

In step 807, the processor 210 may determine whether to rotate the OFS module 770 in response to the change in the angle. According to an embodiment of the present disclosure, the processor 210 may determine whether the change in the angle is a first angle change by the airframe of the unmanned electronic device (for example, see FIG. 5B), or a second angle change by the camera 750 (for example, see FIG. 6B). If the first angle change is detected, the processor 210 may determine that there is no change in the angle of the OFS module 770 and determine not to rotate the OFS module 770. For example, the processor 210 may maintain horizontality of the camera 750 for photographing through the first driving motor, the second driving motor, and the third driving motor according to the first angle change, and as a result, horizontality of the OFS module 770 may also be automatically maintained. If the camera 750 is adjusted by the first driving motor 741, for example, by the pitch axis, the processor 210 may detect that the change in the angle is the second angle change, and may determine that there is a change in the angle of the OFS module 770. If the second angle change is detected, the processor 210 may determine that there is a change in the angle of the OFS module 770 and may determine to rotate the OFS module 770.

In step 809, the processor 210 may generate compensation data corresponding to the change in the angle. According to an embodiment an of the present disclosure, if the second angle change of the camera 750 is detected, the processor 210 may generate compensation data for rotating the fourth driving motor 760 by a driving angle corresponding to the rotation angle of the camera 750 (for example, a driving angle of the first driving motor 741) in the opposite direction (reverse direction) to the rotation of the camera 750 (for example, the rotation of the first driving motor 741). For example, the processor 210 may generate compensation data (an angle in the opposite direction) for offsetting the rotation angle of the camera 750. If the first angle change by the airframe of the unmanned electronic device is detected, the processor 210 may maintain horizontality of the OFS module 770 in response to horizontality being maintained by the gimbal 730. For example, the processor 210 may maintain the postures of the camera 750 and the OFS module 770 by rotating the second driving motor 742 according to the compensation data.

In step 811, the processor 210 may control the driving motors based on the compensation data. According to an embodiment of the present disclosure, the processor 210 may transmit a driving signal corresponding to pitch compensation data to the fourth driving motor 760. For example, the processor 210 may stabilize the OFS module 770 in the upright state by offsetting the rotation (for example, pitch) of the camera 750.

Figure 9:
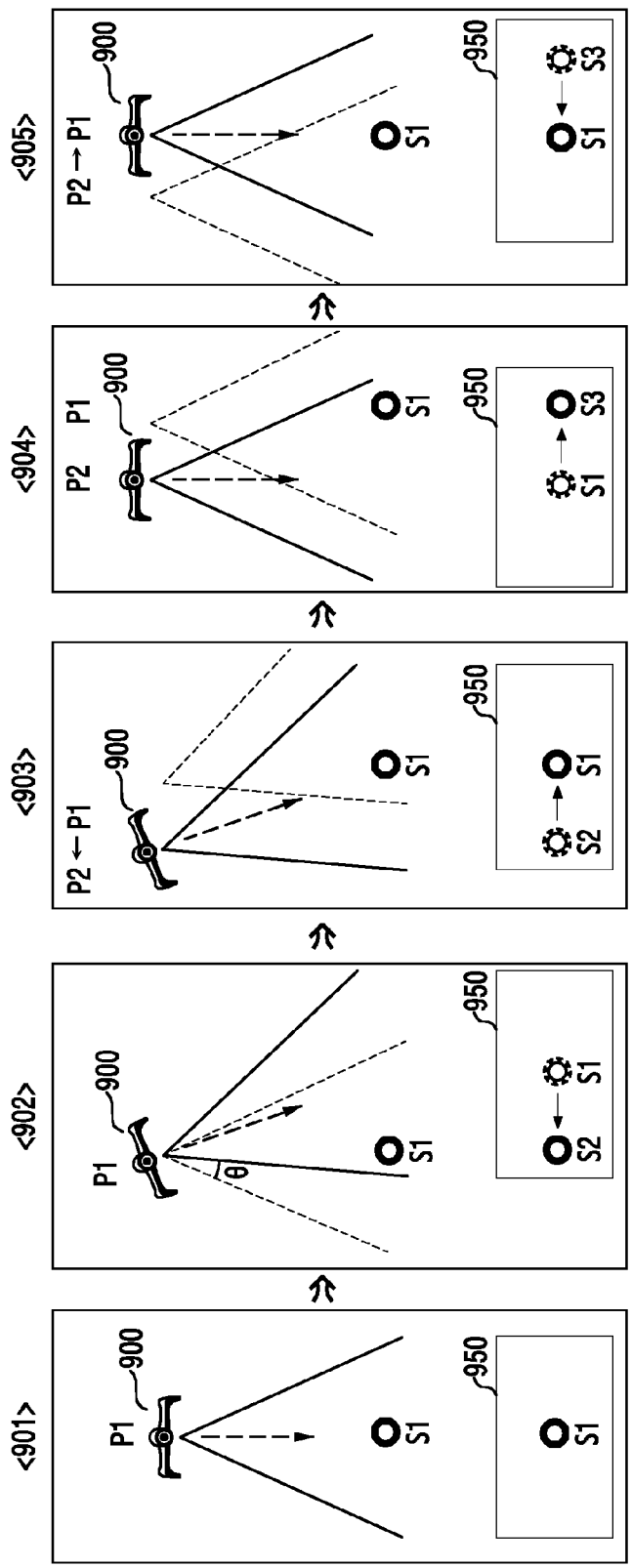
FIGS. 9 and 10 are illustrations of controlling a flight of an unmanned electronic device according to various embodiments of the present disclosure.

FIG. 9 is an illustration of an operation of controlling a flight of an unmanned electronic device according to an embodiment of the present disclosure.

FIG. 9 is an illustration of an operation of maintaining a hovering state by returning to an original position if the angle of the unmanned electronic device is changed by an external factor (for example, an external force, wind, and the like) during hovering and then the unmanned electronic device moves to another position due to the change in the angle. In an embodiment of the present disclosure, FIG. 9 may illustrate an operation of the unmanned electronic device 900 in a conventional method.

Referring to FIG. 9, panel <901> illustrates an example in which the unmanned electronic device 900 is in a hovering state. For example, the unmanned electronic device 900 may be at a first position P1 and may be in a horizontal state (for example, at an angle of 0 degrees). Herein, a position of a real point of interest on the ground at the first position P1 of the unmanned electronic device 900 may be a first point of interest S1. For example, the position of the point of interest which is a target to be identified by the OFS module to maintain hovering may be the first point of interest S1. According to an embodiment of the present disclosure, the unmanned electronic device 900 may photograph and identify the first point of interest S1 on the ground by means of the OFS module in the hovering state. Input image 950 (for example, an identified point of interest) is photographed by the OFS module.

Panel <902> is an example in which the angle is changed due to an external factor (for example, wind and the like) in the hovering state of the unmanned electronic device 900. For example, in panel <902>, the unmanned electronic device 900 may be tilted by a certain angle (θ) at the first position P1 due to the external factor. Herein, if the unmanned electronic device 900 adopts a conventional method, the OFS module is also tilted by the certain angle (θ) according to the changed certain angle (θ) of the unmanned electronic device 900. Accordingly, although the position of the real point of interest on the ground at the first position P1 of the unmanned electronic device 900 is the first point of interest S1, it may be identified that the position of the first point of interest S1 is changed since the OFS module is tilted by the certain angle (θ) and is photographed. For example, in the input image 950 of the OFS module, it may be determined that the reference point of interest for maintaining hovering moved from the position of the first point of interest S1 to the position of a second point of interest S2. For example, it may be determined that the unmanned electronic device 900 is moved.

If it is determined that the point of interest is changed, the unmanned electronic device 900 may perform an operation of restoring the position of the initial first point of interest S1 (or identifying the first point of interest S1), which is the reference point of interest. For example, although the first position P1 is really fixed, the unmanned electronic device 900 may determine to move a length of a distance changed by the point of interest (S1→S2) since it is determined that the point of interest is changed through the input image 950. For example, the position of the point of interest identified by the OFS module may be the second point of interest S2.

Panel <903> illustrates an example in which the unmanned electronic device 900 moves (for example, the first position P1→the second position P2) a length of a distance changed by the point of interest (for example, S1→S2) in response to determining to move. For example, the unmanned electronic device 900 may move from the first position P1 to the second position P2. For example, the unmanned electronic device 900 may move to the second position P2 at which the second point of interest S2 is identified in the input image 950 photographed by the OFS module. Accordingly, the unmanned electronic device 900 may determine that it returns to the original position if the initial first point of interest S1 is identified in the input image 950 of the OFS module.

Panel <904> illustrates an example in which the unmanned electronic device returns to the horizontal state by performing a compensation operation for maintaining horizontality at the certain angle (θ). For example, in panel <904>, the unmanned electronic device 900 may return to the horizontal state (for example, the angle of 0 degrees) by compensating for the tilt by the certain angle (θ) at the second position P2. In this case, by compensating for the tilt of the unmanned electronic device 900, that is, by returning to the horizontal state, the OFS module may also return to the horizontal state. Accordingly, although the position of the real point of interest on the ground is the first point of interest S1, another point of interest (for example, the second point of interest S2) may be photographed by the OFS module, and it may be determined that the position of the first point of interest S1, which is the reference point of interest, is changed. For example, in the input image 950 of the OFS module, it may be determined that the reference point of interest for maintaining hovering moves from the position of the first point of interest S1 to the position of a third point of interest S3. For example, it may be determined that the unmanned electronic device 900 is moved.

If it is determined that the point of interest is changed, the unmanned electronic device 900 may perform an operation for restoring the position of the initial first point of interest S1 which is the reference point of interest (or identifying the first point of interest S1). For example, as the unmanned electronic device 900 determines that the point of interest is changed through the input image 950, the unmanned electronic device 900 may determine to move a length of a distance changed by the point of interest (for example, S1→S3). For example, the position of the point of interest identified by the OFS module may be the third point of interest S3.

Panel <905> illustrates an example in which the unmanned electronic device 900 moves (for example, the second position P2→the first position P1) a length of the distance changed by the point of interest (for example, S1→S3) in response to determining to move. For example, the unmanned electronic device 900 may move from the second position P2 to the first position P1. For example, the unmanned electronic device 900 may move to the first position P1 at which the first point of interest S1 is identified in the input image 950 of the OFS module. Accordingly, the unmanned electronic device 900 may determine that it returns to the original position if the initial first point of interest S1 in the input image 950 of the OFS module is identified, and may maintain hovering.

As described above, if the unmanned electronic device 900 according to the conventional method is influenced by an external factor (for example, an external force, wind, and the like), the airframe of the unmanned electronic device 900 may be tilted. In this case, as the OFS module mounted in the airframe is tilted by the same angle, the point of interest on the ground may be identified as being moved. Accordingly, the unmanned electronic device 900 may generate a flight control signal for returning to the original position. However, since the position of the unmanned electronic device 900 is really fixed, the flight control signal may be unnecessary. In addition, the unmanned electronic device 900 may perform an unnecessary flight due to the flight control signal. As illustrated in Table 7 below, such an incorrect identification by the OFS module may result in unnecessary energy consumption as the unmanned electronic device 900 unnecessarily moves positions and thus additionally moves to return to the original position. Various revolutions-per-minute (rpm) values in Table 7 below are provided to compare the conventional method and various embodiments of the present disclosure, and may be implemented as various setting values according to an output of a motor. For example, the unmanned electronic device 900 of the conventional method should consume more energy due to the outputs of the first to fourth electric motors 711, 712, 713, and 714 (for example, thrust of the unmanned electronic device 900) necessary for maintaining horizontality and unnecessarily moving.

TABLE 7

| Elements (referring to the elements of FIG. 7, for example) | Control state during hovering | Control state when an external factor occurs |
|---|---|---|
| Sensor 731 | On (0 degrees) | On (tilted by θ) |
| OFS module 770 | Control on | Control on |
| First electric motor 711 | 10000 rpm | 13000 rpm |
| Second electric motor 712 | 10000 rpm | 13000 rpm |
| Third electric motor 713 | 10000 rpm | 16000 rpm |
| Fourth electric motor 714 | 10000 rpm | 16000 rpm |

Figure 10:
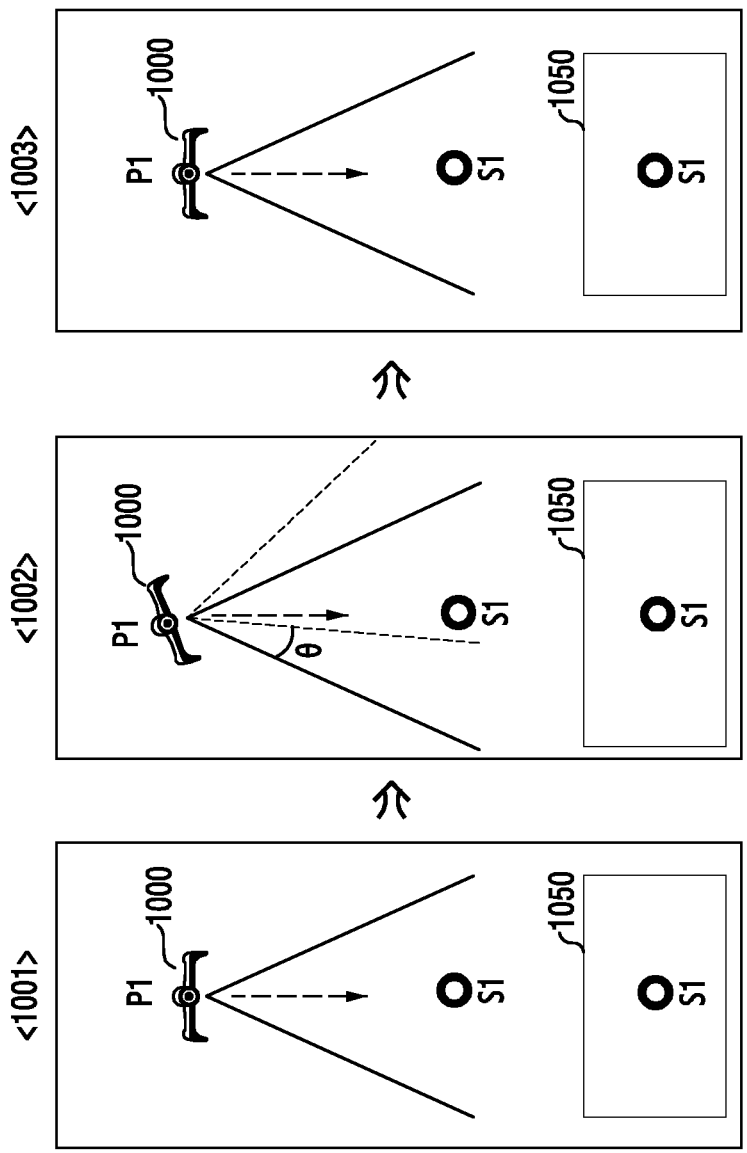

FIG. 10 is an illustration of an operation of controlling a flight of an unmanned electronic device according to an embodiment of the present disclosure.

FIG. 10 is an illustration of an operation of maintaining a hovering state at an original position without moving if the angle of the unmanned electronic device is changed by an external factor (for example, an external force, wind, and the like) during hovering. In an embodiment of the present disclosure, FIG. 10 may illustrate an operation of the unmanned electronic device 1000 in comparison to the conventional method of FIG. 9.

Referring to FIG. 10, panel <1001> illustrates an example in which the unmanned electronic device 1000 is in a hovering state. For example, the unmanned electronic device 1000 may be at a first position P1 and may be in a horizontal state (for example, at an angle of 0 degrees). Herein, a position of a real point of interest on the ground at the first position P1 of the unmanned electronic device 1000 may be a first point of interest S1. For example, the position of the point of interest which is a target to be identified by the OFS module to maintain hovering may be the first point of interest S1. According to an embodiment of the present disclosure, the unmanned electronic device 1000 may photograph and identify the first point of interest S1 on the ground by means of the OFS module in the hovering state. Input image 1050 (for example, an identified point of interest) is photographed by the OFS module.

Panel <1002> illustrates an example in which the angle of the unmanned electronic device 1000 is changed due to an external factor (for example, wind and the like) in the hovering state. For example, in panel <1002>, the unmanned electronic device 1000 may be tilted by a certain angle (θ) at the first position (P1) due to an external factor. Herein, in the case of the unmanned electronic device 1000 according to an embodiment of the present disclosure, the OFS module may continuously maintain horizontality with respect to the ground, regardless of the change in the angle of the unmanned electronic device by the certain angle (θ). Accordingly, in the case of the unmanned electronic device 1000, there is only the change in the angle of the airframe by the certain angle (θ), and there is no change in the point of interest identified by the OFS module. Accordingly, the unmanned electronic device 1000 may not perform an unnecessary operation of moving due to misidentification of a change in the point of interest as in the example of FIG. 9 described above.

For example, as shown in panel <1003>, the unmanned electronic device 1000 may perform only an operation for maintaining horizontality. Panel <1003> illustrates an example in which the unmanned electronic device 1000 returns to the horizontal state by performing a compensation operation for maintaining horizontality at the certain angle (θ). For example, in panel <1003>, the unmanned electronic device 1000 may return to the horizontal state (for example, an angle of 0 degrees) by compensating for the tilt by the certain angle (θ) at the first position P1. In this case, regardless of whether the tilt of the unmanned electronic device 1000 is compensated for, that is, the unmanned electronic device 100 returns to the horizontal state, the OFS module may maintain the horizontal state. Accordingly, the position of the real point of interest on the ground at the first position P1 of the unmanned electronic device 1000 is the first point of interest S1, and the OFS module may identify the first point of interest S1 as it is without a change in the point of interest.

Accordingly, the unmanned electronic device 1000 may not perform an unnecessary operation for returning to the original position unlike in the example of FIG. 9. Compared to the example of FIG. 9, the unmanned electronic device 1000 according to an embodiment of the present disclosure may not cause unnecessary energy consumption which may be accompanied by unnecessary position movement and additional movement to return to the original position. An example of this is illustrated in Table 8 below. The rpm values in Table 8 below are for comparing the conventional method and various embodiments of the present disclosure, and may be implemented as various setting values according to an output of a motor. For example, the unmanned electronic device 1000 may consume minimum energy due to the outputs to the first to fourth electric motors 711, 712, 713, and 714 (for example, thrust of the unmanned electronic device 900) necessary for maintaining horizontality.

TABLE 8

| Elements (referring to the elements of FIG. 7, for example) | Control state during hovering | Control state when an external factor occurs |
|---|---|---|
| Sensor 731 | On (0 degrees) | On (tilted by θ) |
| OFS module 770 | Control on | Control on |
| First electric motor 711 | 10000 rpm | 8000 rpm |
| Second electric motor 712 | 10000 rpm | 8000 rpm |
| Third electric motor 713 | 10000 rpm | 14000 rpm |
| Fourth electric motor 714 | 10000 rpm | 14000 rpm |

According to an embodiment of the present disclosure, if an external factor (for example, an external force, wind, and the like) occurs while the unmanned electronic device 1000 is hovering, the angle of the unmanned electronic device 1000 may be changed, but the OFS module may receive a point of interest on the ground as an input image regardless of a change in the angle of the airframe. Accordingly, the unmanned electronic device 1000 may stably maintain the hovering state without performing an unnecessary flight and calculating the angle of the unmanned electronic device and thrust (for example, by the rotation of the electric motor) for the unnecessary flight.

The results of comparing FIGS. 9 and 10 described above may be illustrated in Tables 9 and 10 below. Table 9 below compares the unmanned electronic device 1000 of the present disclosure and the unmanned electronic device 900 of the conventional method regarding the operation of maintaining hovering at an original position when an external factor (for example, an external force, wind, and the like) occurs in their hovering states, respectively. For example, Table 9 below compares operation states of the unmanned electronic device 900 of the conventional method according to panels <901>, <902>, <903>, <904>, and <905>, with operation states of the unmanned electronic device 1000 of an embodiment of the present disclosure according to panels <1001>, <1002>, and <1003> of FIG. 10.

tion P2→first position P1, and energy consumption accompanied by the unnecessary position movement may be prevented. According to an embodiment of the present disclosure, one electric motor may consume a first current (for example, 1.5 amperes (1.5 A)) during hovering of the unmanned electronic device, and may consume a second current (for example, 3 A) during a movement. That is, current consumption may increase. Accordingly, current consumption increases in the conventional method due to an unnecessary movement, whereas an unnecessary position movement may be prevented in advance and thus high

TABLE 9

|  |  | <901> | <902> | <903> | <904> | <905> |
|---|---|---|---|---|---|---|
| Related-art method | Operation |  |  |  |  |  |
|  | State | Hovering | External wind occurring | Moving | Horizontal state | Moving and Hovering |
|  | Position | P1 | P1 | P2 | P2 | P1 |
|  | Angle | Horizontal (0°) | Tilted (θ) | Tilted (θ) | Horizontal (0°) | Horizontal (0°) |
|  | Position of real point of interest | S1 | S1 | S1 | S1 | S1 |
|  | Position of identified point of interest of OFS module | S1 | S2 | S1 | S3 | S1 |
| Present disclosure | Operation | <1001> | <1002> | → |  | <1003> |
|  | State | Hovering | External wind occurring | → |  | Horizontal and hovering |
|  | Position | P1 | P1 |  |  | P1 |
|  | Angle | Horizontal (0°) | Tilted (θ) |  |  | Horizontal (0°) |
|  | Position of real point of interest | S1 | S1 |  |  | S1 |
|  | Position of identified point of interest of OFS module | S1 | S1 |  |  | S1 |

For example, as shown in Table 9 above, the unmanned electronic device of the related-art method may perform processes in panels <901> (for example, a hovering state), <902> (for example, an external wind occurrence state), <903> (for example, a moving state of the unmanned electronic device), <904> (for example, a horizontal state of the unmanned electronic device), and <905> (for example, a moving and hovering state of the unmanned electronic device).

On the other hand, the unmanned electronic device according to an embodiment of the present disclosure may not require processes in the moving state (for example, panel <903>) of the unmanned electronic device and in the horizontal state (for example, panel <904>) of the unmanned electronic device, and for example, may perform processes in panels <1001> (for example, a hovering state), <1002> (for example, an external wind occurrence state), and <1003> (for example, a horizontal and hovering state of the unmanned electronic device).

Accordingly, the present disclosure may provide an effect of enhancing current consumption caused by an unnecessary movement of the unmanned electronic device. For example, the unmanned electronic device may be prevented from unnecessarily moving like first position P1→second posicurrent consumption may be prevented. In addition, a constant image may be ensured due to an unchangeable position of the unmanned electronic device.

Figure 11:
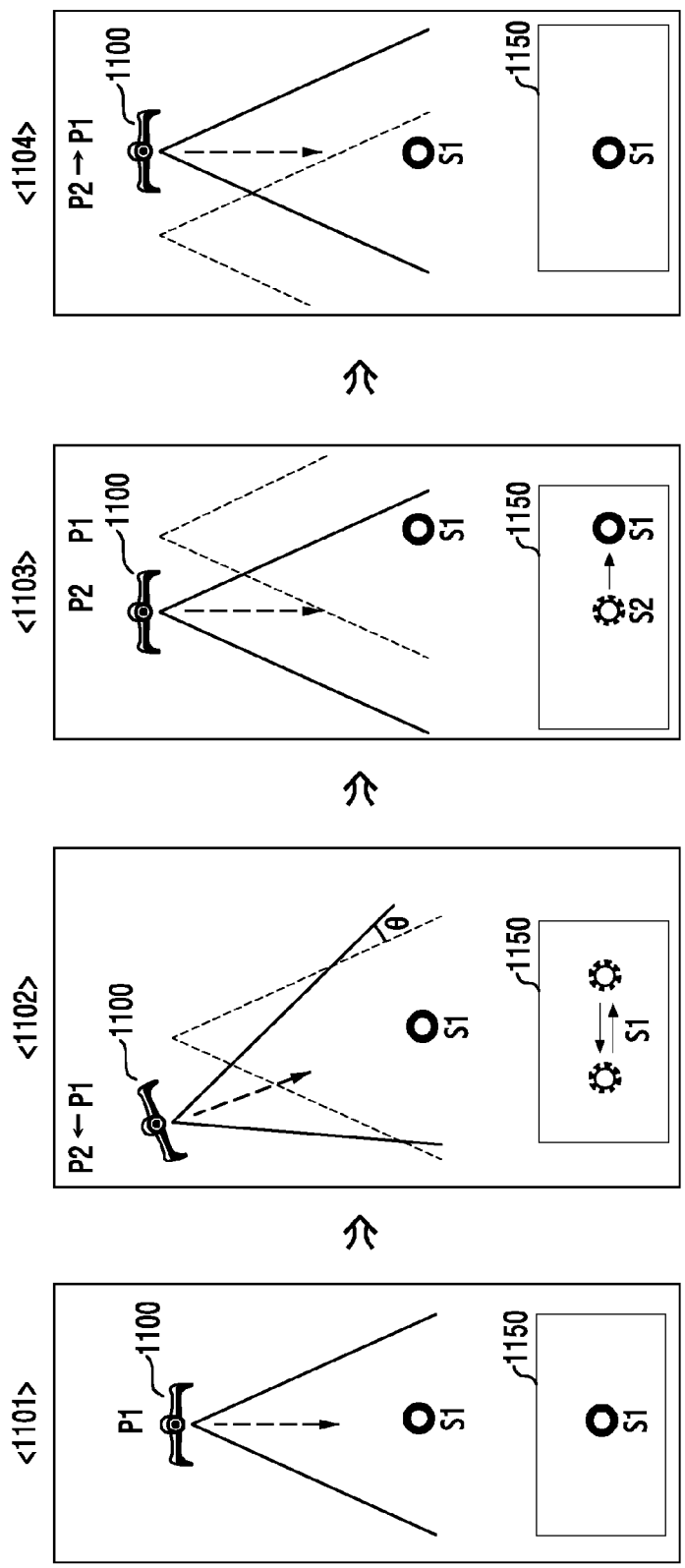
FIGS. 11 and 12 are illustrations of controlling a flight of an unmanned electronic device according to various embodiments of the present disclosure.

FIG. 11 is an illustration of an operation of controlling a flight of an unmanned electronic device according to an embodiment of the present disclosure.

FIG. 11 is an illustration of an operation of maintaining a hovering state by returning to an original position from a moved position if an angle of the unmanned electronic device is changed and the unmanned electronic device is moved by an external factor (for example, an external force, wind, and the like) during hovering. In an embodiment of the present disclosure, FIG. 11 may illustrate an operation of the unmanned electronic device 1100 in the conventional method.

Referring to FIG. 11, panel <1101> illustrates an example in which the unmanned electronic device 1100 is in a hovering state. For example, the unmanned electronic device 1100 may be at a first position P1 and may be in a horizontal state (for example, at an angle of 0 degrees). Herein, a position of a real point of interest on the ground at the first position P1 of the unmanned electronic device 1100 may be a first point of interest S1. For example, the position of the point of interest which is a target to be identified by the OFS module to maintain hovering may be the first point of interest S1. According to an embodiment of the present disclosure, the unmanned electronic device 1100 may photograph and identify the first point of interest S1 on the ground by means of the OFS module in the hovering state. Input image 1150 (for example, an identified point of interest) is photographed by the OFS module.

Panel <1102> illustrates an example in which the angle and the position of the unmanned electronic device 1100 are changed due to an external factor (for example, wind and the like) in the hovering state. For example, in panel <1102>, the unmanned electronic device 1100 may be tilted by a certain angle (θ) and may move from the first position P1 to a second position P2 due to an external factor. Herein, in the case of the unmanned electronic device 1100 of the conventional method, the OFS module may also be tilted by the certain angle (θ) according to the changed certain angle (θ) of the unmanned electronic device 1100. Accordingly, although the position of the real point of interest on the ground is the first point of interest S1, the OFS module may not identify the point of interest and may determine an unfixed state due to the tilted angle of the OFS module (for example, the certain angle (θ)) and the position movement (for example, a movement to the second position P2) of the unmanned electronic device 1100.

For example, as the OFS module is tilted by the certain angle (θ), it may be determined that the position of the first point of interest S1 is changed (for example, a second point of interest S2 is identified) in the input image 1150, and, as the unmanned electronic device 1100 is moved in this state, another point of interest (for example, a third point of interest S3) may be identified in the input image 1150. Alternatively, the unmanned electronic device 1100 may identify that the point of interest is changed if the electronic device 1100 is tilted by the certain angle (θ), and then identify the first point of interest S1, which is a reference, due to the movement of the unmanned electronic device 1100, and, as illustrated in panel <1103>, may determine that the point of interest is changed when the tilt is compensated and the unmanned electronic device 1100 returns to the horizontal state. Accordingly, the unmanned electronic device 1100 may not normally determine the point of interest (for example, the first point of interest S1) for the reference due to the repeated change of the point of interest, and accordingly, may determine an unfixed state. Accordingly, the unmanned electronic device 1100 may perform the operation of identifying the point of interest after maintaining horizontality at the certain angle (θ).

Panel <1103> illustrates an example in which the unmanned electronic device 1100 returns to the horizontal state by performing a compensation operation for maintaining horizontality at the certain angle (θ). For example, in panel <1103>, the unmanned electronic device 1100 may return to the horizontal state (for example, an angle of 0 degrees) by compensating for the tilt by the certain angle (θ) at the second position P2 to which the unmanned electronic device 1100 has moved due to the external factor. In this case, by compensating for the tilt of the unmanned electronic device 1100, that is, by returning to the horizontal state, the OFS module may also return to the horizontal state. Accordingly, although the position of the real point of interest on the ground is the first point of interest S1, the OFS module may photograph another point of interest (for example, the second point of interest S2) in the input image 1150 as the unmanned electronic device 1100 moves. In this case, the unmanned electronic device 1100 may determine that the position of the first point of interest S1, which is a reference point of interest, is changed, and may perform an operation of restoring the position of the initial first point of interest S1 which is the reference point of interest (or identifying the first point of interest S1). For example, the unmanned electronic device 1100 may determine that the point of interest is changed through the input image 1150 and thus determine to move a length of the changed distance of the point of interest (for example, S2→S1).

Panel <1104> illustrates an example in which the unmanned electronic device 1100 moves (for example, the second position P2→the first position P1) a length of the changed distance of the point of interest (for example, S2→S1) in response to determining to move. For example, the unmanned electronic device 1100 may move from the second position P2 to the first position P1. For example, the unmanned electronic device 1100 may move to the first position P1 at which the first point of interest S1 is identified in the input image 1150 of the OFS module. Accordingly, the unmanned electronic device 1100 may determine that it returns to the original position if the initial first point of interest S1 is identified in the input image 1150 of the OFS module, and may maintain hovering.

As described above, if the unmanned electronic device 1100 according to the conventional method is influenced by an external factor (for example, an external force, wind, and the like), the airframe of the unmanned electronic device 100 may be tilted and may also move. In this case, as the OFS module mounted in the airframe is tilted by the same angle as in the airframe, the reference point of interest may not be exactly identified due to the change in the point of interest the tilt and the change in the point of interest by the movement.

For example, the angle and the position of the unmanned electronic device 1100 may be changed due to an external factor in the hovering state. In this case, the unmanned electronic device 1100 may perform an operation for maintaining hovering and an operation for returning to the original position (for example, the first position P1) from the moved position (for example, the second position P2) due to the external factor as in the example of FIG. 9 described above. Accordingly, the unmanned electronic device 1100 should consume more energy due to the outputs to the first to fourth electric motors 711, 712, 713, and 714 (for example, thrust of the unmanned electronic device 1100) necessary for maintaining horizontality and unnecessarily moving due to misidentification of the change in the point of interest by the OFS module. An example of this is illustrated in Table 10 below. The rpm values in Table 10 below are provided to compare the conventional method and various embodiments of the present disclosure, and may be implemented as various setting values according to an output of a motor.

TABLE 10

| Elements (referring to the elements of FIG. 7, for example) | Control state during hovering | Control state when an external factor occurs |
|---|---|---|
| Sensor 731 | On (0 degrees) | On (tilted by θ) |
| OFS module 770 | Control on | Control on |
| First electric motor 711 | 10000 rpm | 10000 rpm |
| Second electric motor 712 | 10000 rpm | 10000 rpm |
| Third electric motor 713 | 10000 rpm | 12000 rpm |
| Fourth electric motor 714 | 10000 rpm | 12000 rpm |

For example, if the tilt is measured by the sensor 731, the unmanned electronic device 1100 may not control the electric motors under flight control according to a signal of the OFS module 770, and may only process a control operation for maintaining the posture of the unmanned electronic device 1100. In addition, the unmanned electronic device 1100 may cause unnecessary energy consumption since the unmanned electronic device 110 requires an additional movement due to the changed position and must return to the original position.

Figure 12:
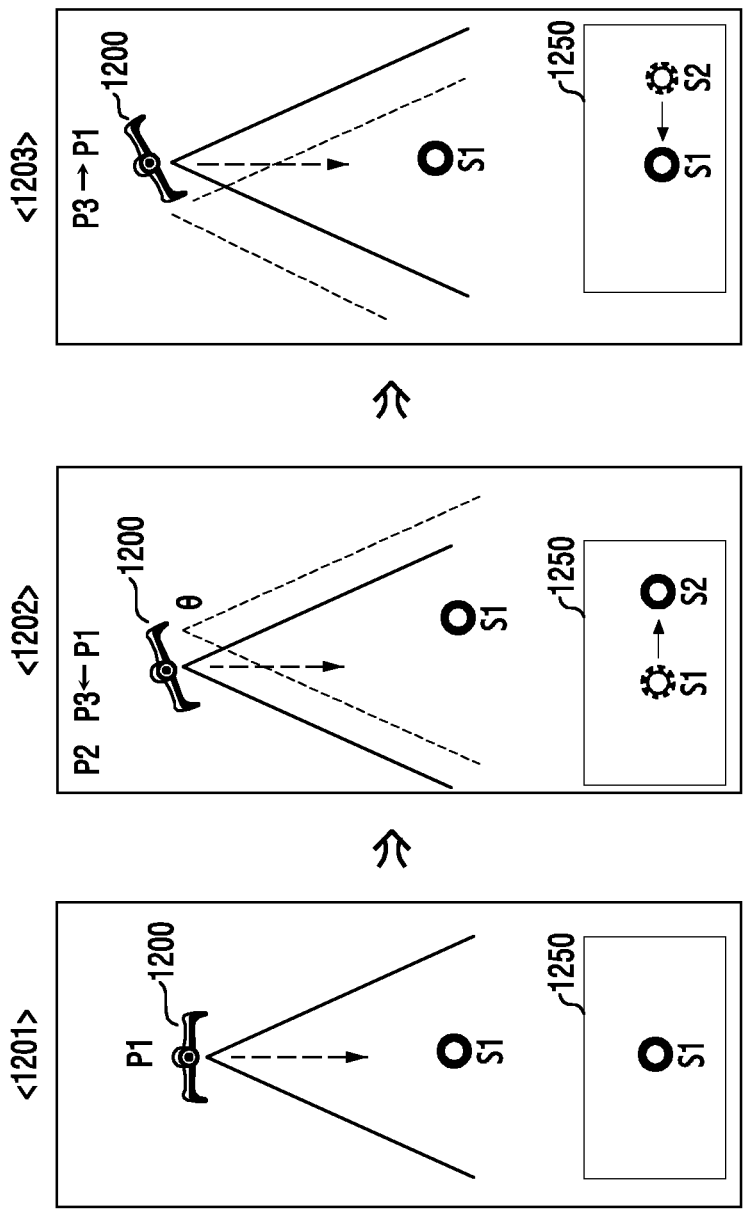

FIG. 12 is an illustration of an operation of controlling a flight of an unmanned electronic device according to an embodiment of the present disclosure.

FIG. 12 is an illustration of an operation of maintaining a hovering state by returning to an original position from a moved position if the angle of the unmanned electronic device is changed and the unmanned electronic device is moved by an external factor (for example, an external force, wind, and the like) during hovering. In an embodiment of the present disclosure, FIG. 12 may illustrate an operation of the unmanned electronic device 1200 in comparison to the conventional method of FIG. 11.

Referring to FIG. 12, panel <1201> illustrates an example in which the unmanned electronic device 1200 is in a hovering state. For example, the unmanned electronic device 1200 may be at a first position P1 and may be in a horizontal state (for example, at an angle of 0 degrees). Herein, a position of a real point of interest on the ground at the first position P1 of the unmanned electronic device 1200 may be a first point of interest S1. For example, the position of the point of interest which is a target to be identified by the OFS module to maintain hovering may be the first point of interest S1. According to an embodiment of the present disclosure, the unmanned electronic device 1200 may photograph and identify the first point of interest S1 on the ground by means of the OFS module in the hovering state. Input image 1250 (for example, an identified point of interest) is photographed by the OFS module.

Panel <1202> illustrates an example in which the angle and the position of the unmanned electronic device 1200 are changed due to an external factor (for example, wind and the like) in the hovering state. For example, in panel <1202>, the unmanned electronic device 1200 may be tilted by a certain angle (θ) at the first position P1 and may move from the first position P1 to a second position P2 due to an external factor. Herein, in the case of the unmanned electronic device 1200 according to an embodiment of the present disclosure, the OFS module may continuously maintain horizontality with respect to the ground, regardless of the change in the angle of the unmanned electronic device by the certain angle (θ). Accordingly, in the case of the unmanned electronic device 1200, there is only the change in the angle of the airframe by the certain angle (θ), and there is no change in the point of interest identified by the OFS module. Accordingly, the unmanned electronic device 1200 may not perform an unnecessary operation for moving due to misidentification of a change in the point of interest as in the example of FIG. 11 described above.

For example, the unmanned electronic device 1200 may always identify a change in the point of interest on the ground in real time regardless of a change in the angle. For example, the unmanned electronic device 1200 may always photograph and identify a point of interest on the ground (for example, the first point of interest S1) as an input image regardless of a change in the angle of the airframe. Accordingly, if the unmanned electronic device 1200 is moved as shown in panel <1202>, the unmanned electronic device 1200 may identify a change in the point of interest (for example, S1→S2) in real time. For example, even if the unmanned electronic device 1200 moves (for example, the first position P1→second position P2) while being titled due to an external factor, the unmanned electronic device 1200 may detect that the first point of interest S1 is changed (moved) to the second point of interest S2 in the input image 1250 in real time.

Accordingly, as illustrated in panels <1202> and <1203>, the unmanned electronic device 1200 according to an embodiment of the present disclosure may operate to prevent an unintended movement to a third position P3 (for example, between the first position P1 and the second position P2) which is closer to the original position than the second position P1 before the unmanned electronic device 1200 moves from the first position P1 to the second position P2. For example, the unmanned electronic device 1200 may rapidly identify that the point of interest is shifted in the input image 1250 of the OFS module to the third position P3, and accordingly, may promptly return to the original first position P1.

Accordingly, compared to the unmanned electronic device in the example of FIG. 11, the unmanned electronic device 1200 according to an embodiment of the present disclosure may reduce a range of movement and thus may reduce energy consumption accompanied by a movement. An example of this is illustrated in Table 11 below. The rpm values in Table 11 below are provided to compare the conventional method and various embodiments of the present disclosure, and may be implemented as various setting values according to an output of a motor.

TABLE 11

| Elements (referring to the elements of FIG. 7, for example) | Control state during hovering | Control state when an external factor occurs |
|---|---|---|
| Sensor 731 | On (0 degrees) | On (tilted by θ) |
| OFS module 770 | Control on | Control on |
| First electric motor 711 | 10000 rpm | 9000 rpm |
| Second electric motor 712 | 10000 rpm | 9000 rpm |
| Third electric motor 713 | 10000 rpm | 13000 rpm |
| Fourth electric motor 714 | 10000 rpm | 13000 rpm |

For example, if the angle and the position of the airframe are changed (for example, a position movement) due to an external factor, the unmanned electronic device 1200 may identify that the point of interest is shifted through the OFS module 770 in real time before the unmanned electronic device 1200 moves from the first position P1 to the second position P2, for example, to the third position between the first position P1 and the second position P2, and may move (return) to the first position P1 which is the original position more rapidly than in the conventional method. Accordingly, a range of movement of the unmanned electronic device 1200 may be reduced in comparison to the conventional method. In addition, according to an embodiment of the present disclosure, if a tilt is measured through the sensor 731, the unmanned electronic device 1200 may control the electric motors under flight control according to a signal of the OFS module 770. Therefore, the unmanned electronic device 1200 may move less than in the conventional method, and accordingly, may perform less movement control.

Hereinafter, a processor for controlling the operation of the unmanned electronic device may be the processor 210 shown in FIG. 2, but the present disclosure is not limited thereto. For example, according to an embodiment of the present disclosure, the processor may include one or more processors (for example, the first processor 715 and the second processor 732 of FIG. 7) and may control various operations. The first processor 715 may process an operation related to a flight of the unmanned electronic device, and the second processor 732 may process an operation related to maintaining, by the gimbal 730, the upright state of the camera 750 and the OFS module 770. The first processor 715 may include a function of the second processor 732.

Figure 13:
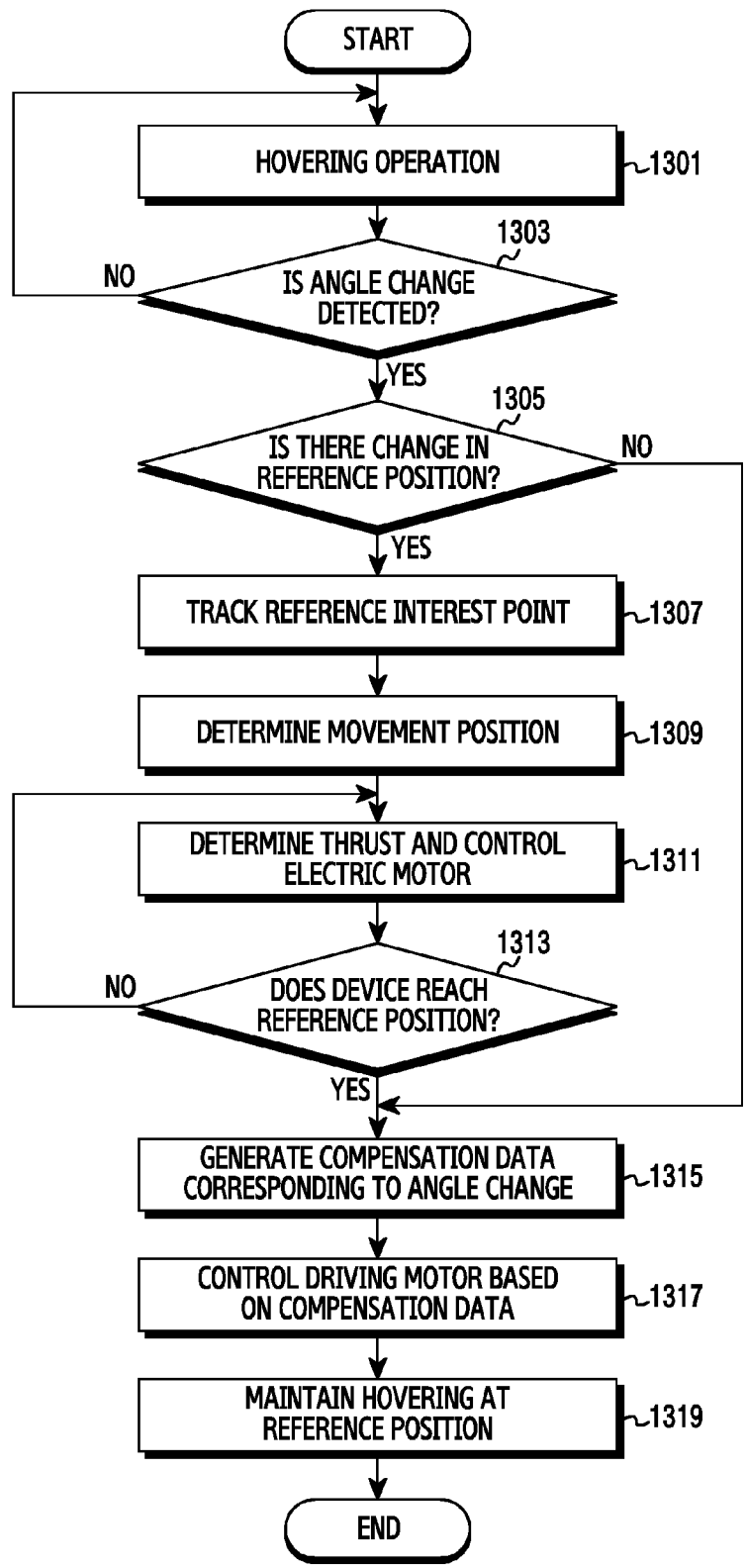
FIG. 13 is a flowchart of a method of controlling hovering in an electronic device according to an embodiment of the present disclosure.

FIG. 13 is a flowchart of a method of controlling hovering in an unmanned electronic device according to an embodiment of the present disclosure.

Referring to FIG. 13, in step 1301, the processor 210 may perform a hovering operation of the unmanned electronic device. For example, the processor 210 may control the unmanned electronic device to move to a set position in space and maintain hovering.

In step 1303, the processor 210 may determine whether a change in an angle is detected in the hovering state of the unmanned electronic device. For example, the processor 210 may determine whether a change in the angle of the airframe of the unmanned electronic device or a change in the angle of the camera is detected.

In step 1303, if a change in the angle is not detected, the processor 210 may return to step 1301 to perform operations after step 1301.

In step 1303, if a change in the angle is detected, the processor 210 may determine whether a reference position is changed in step 1305. For example, the processor 210 may identify a reference point of interest through the OFS module at the hovering position, and may determine whether the position is changed based on the identified reference point of interest. For example, the processor 210 may determine whether the position of the reference point of interest is changed by analyzing an input image of the OFS module.

In step 1305, if the change in the reference position is not detected, the processor 210 may proceed to step 1315 to perform operations after step 1315.

In step 1305, if the change in the reference position is detected, the processor 210 may track the reference point of interest in step 1307.

In step 1309, the processor 210 may determine a movement position based on a result of tracking in step 1305. For example, the processor 210 may track the position of the changed reference point of interest based on the input image of the OFS module.

In step 1311, the processor 210 may determine thrust in response to the movement position, and may control at least one electric motor based on the determined thrust. For example, the processor 210 may operate a propeller using the electric motor and control the unmanned electronic device to move to the determined movement position.

In step 1313, the processor 210 may determine whether the unmanned electronic device reaches the reference position. For example, the processor 210 may determine whether the unmanned electronic device reaches the determined movement position while the unmanned electronic device is moving. According to an embodiment of the present disclosure, the processor 210 may determine whether the reference point of interest corresponding to the reference position is identified or not based on the input image of the OFS module.

In step 1313, if it is determined that the unmanned electronic device does not reach the reference position, the processor 210 may return to step 1311 to perform operations after step 1311.

In step 1313, if it is determined that the unmanned electronic device reaches the reference position, the processor 210 may generate compensation data corresponding to the change in the angle. According to an embodiment of the present disclosure, the compensation data may be, for example, data for controlling at least a part of roll (for example, a rotation on the x-axis), pitch (for example, a rotation on the y-axis), or yaw (for example, rotation on the z-axis) of the unmanned electronic device or the camera. The processor 210 may generate pitch compensation data and transmit the pitch compensation data to the motor driver.

In step 1317, the processor 210 may control a driving motor based on the compensation data. According to an embodiment of the present disclosure, the processor 210 may transmit the pitch compensation data to the motor driver, and the motor driver may convert the pitch compensation data into a motor driving signal and transmit the motor driving signal to a pitch driving motor to control the pitch driving motor.

In step 1319, the processor 210 may maintain hovering at the reference position. For example, the processor 210 may return to the horizontal state by performing a compensation operation for maintaining horizontality of the unmanned electronic device, and then may control the hovering operation at the corresponding position.

Figure 14:
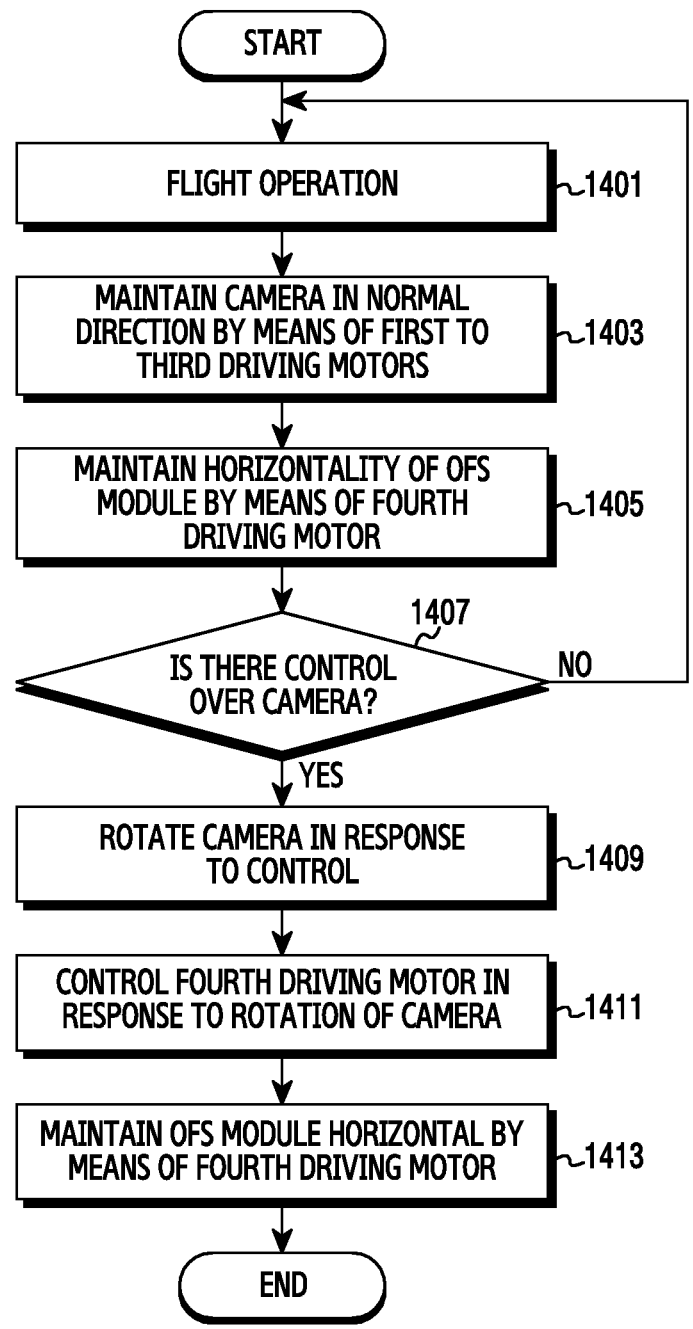
FIG. 14 is a flowchart of a method of maintaining horizontality of an OFS module in an unmanned electronic device according to an embodiment of the present disclosure.

FIG. 14 is a flowchart of a method of maintaining horizontality of an OFS module in an unmanned electronic device according to an embodiment of the present disclosure.

Referring to FIG. 14, in step 1401, the processor 210 may control a flight operation of the unmanned electronic device. For example, the processor 210 may control an operation related to a motion (or a flight) of the unmanned electronic device, such as levitation, movement, rotation, hovering, and the like.

In step 1403, the processor 210 may control the camera to maintain a direction by means of the first to third driving motors (for example, a pitch driving motor, a roll driving motor, and a yaw driving motor for the camera) during the flight operation of the unmanned electronic device. For example, the processor 210 may adjust the first to third driving motors using sensor information in the gimbal. According to an embodiment of the present disclosure, the processor 210 may include an MCU of the gimbal, where the MCU may reduce a vibration generated during the flight of the unmanned electronic device, and may control the camera to maintain the direction using the sensor information of the gimbal.

In step 1405, the processor 210 may control the OFS module to maintain horizontality by means of the fourth driving motor (for example, a pitch driving motor for the OFS module) during the flight operation of the unmanned electronic device. According to an embodiment of the present disclosure, the processor 210 may include an MCU and may adjust the fourth driving motor to allow the OFS module to face the ground, for example, to maintain horizontality.

In step 1407, the processor 210 may determine whether there is control over the camera. For example, the processor 210 may determine whether a control signal for controlling the camera is received from another electronic device (for example, a smart phone, a tablet PC, a remote controller, and the like) to which wireless communication is connected. In an embodiment of the present disclosure, the processor 210 may determine whether it is necessary to control the camera based on a position and composition which are set for photographing.

In step 1407, if it is determined that there is no control over the camera, the processor 210 may return to step 1401 to perform operations after step 1401.

In step 1407, if it is determined that there is control over the camera, the processor 210 may control the camera to rotate in step 1409. According to an embodiment of the present disclosure, if a user adjusts a rotation on the pitch axis to change the composition of the camera using another electronic device, a pitch angle control signal may be transmitted to the second processor (for example, an MCU) of the gimbal through the first processor (for example, an AP). The second processor may identify sensor information of the sensor, and may adjust a pitch angle of the camera using the first driving motor (for example, a pitch driving motor) based on at least a part of the control signal and the sensor information.

In step 1411, the processor 210 may control the fourth driving motor opposite to the rotation of the camera. According to an embodiment of the present disclosure, the second processor may adjust the fourth driving motor to rotate in the opposite direction of the rotation direction of the camera (or the rotation direction of the first driving motor) so as to allow the OFS module to face the ground without being influenced by a change in the pitch angle.

In step 1413, the processor 210 may maintain horizontality of the OFS module by means of the fourth driving motor.

Figure 15:
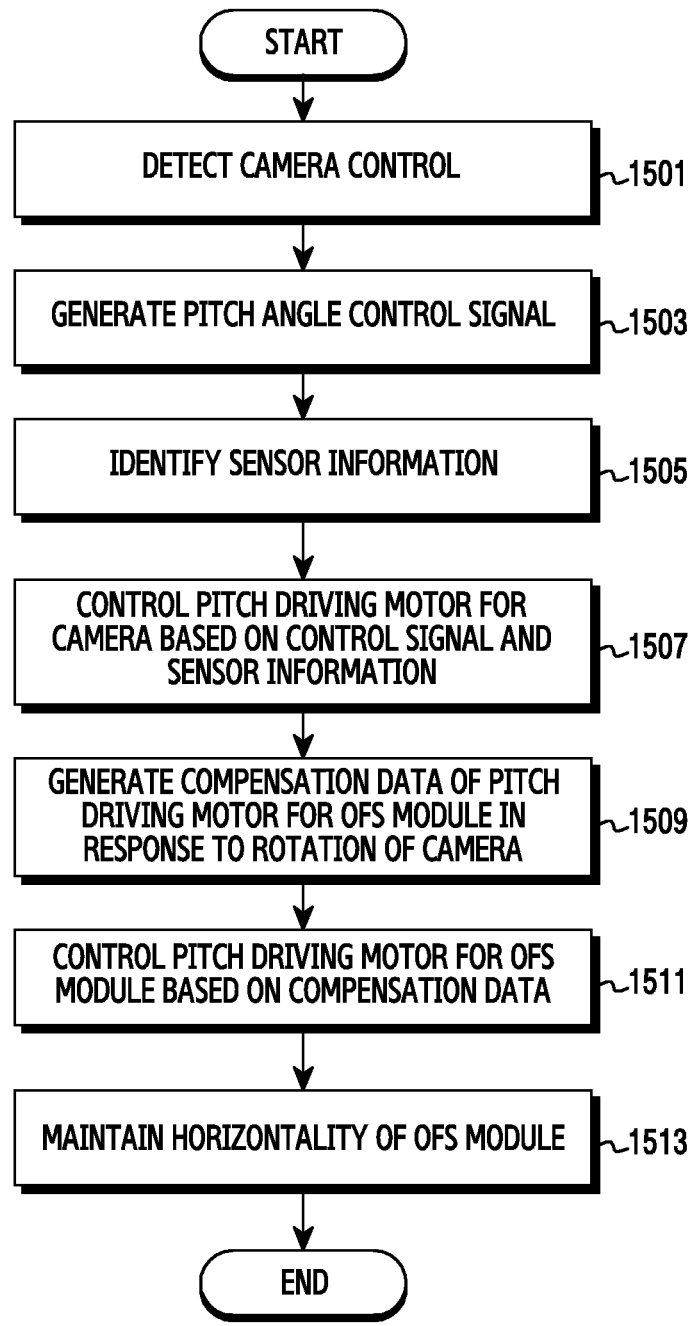
FIG. 15 is a flowchart of a method of controlling an OFS module in an unmanned electronic device according to an embodiment of the present disclosure.

FIG. 15 is a flowchart of a method of controlling an OFS module in an unmanned electronic device according to an embodiment of the present disclosure.

Referring to FIG. 15, in step 1501, the processor 210 may detect control over the camera. For example, the processor 210 may determine control over the camera based on a control signal related to camera control, which is received from another electronic device (for example, a smart phone, a tablet PC, a remote controller, and the like) to which wireless communication is connected, or setting information related to a position and composition set for auto photographing.

In step 1503, the processor 210 may generate a control signal for controlling a pitch angle of the camera. For example, the processor 210 may generate a control signal for controlling the camera as much as a pitch angle corresponding to the received control signal or setting information.

In step 1505, the processor 210 may identify sensor information. For example, the processor 210 (for example, the second processor of the gimbal) may determine a degree of tilt of the unmanned electronic device based on the sensor information received from the sensor of the gimbal.

In step 1507, the processor 210 may control the first pitch driving motor for the camera based on the control signal and the sensor information. For example, a pitch angle control signal may be transmitted to the second processor (for example, an MCU) of the gimbal through the first processor (for example, the AP). The second processor may identify the sensor information of the sensor, determine a pitch angle of the camera based on at least a part of the control signal and the sensor information, and adjust the pitch driving motor for the camera according to the determined pitch angle.

In step 1509, the processor 210 may generate compensation data of the second pitch driving motor for the OFS module opposite to the camera rotation. For example, the compensation data is to offset the rotation of the first pitch driving motor, and may be set as an opposite rotation angle (for example, −pitch angle) corresponding to the rotation angle (for example, +pitch angle) of the first pitch driving motor.

In step 511, the processor 210 may control the second pitch driving motor for the OFS module based on the compensation data. According to an embodiment of the present disclosure, the processor 210 may adjust the second pitch driving motor to rotate in the opposite direction of the rotation direction of the camera (or the rotation direction of the first pitch driving motor) so as to allow the OFS module to face the ground without being influenced by a change in the pitch angle of the camera.

In step 1513, the processor 210 may maintain the OFS module horizontally. For example, the processor 210 may stabilize the OFS module in an upright state by offsetting the rotation (for example, pitch) of the camera.

As described above, a method of operating an electronic device according to an embodiment of the present disclosure may include controlling hovering of the electronic device using a first motor for a thrust related to a flight of the electronic device; during a hovering operation of the electronic device, controlling to maintain horizontality of a first camera for taking an image and horizontality of a second camera for detecting a point of interest on the ground as an input image; detecting a change in angle of the electronic device during hovering of the electronic device; controlling the second motor to maintain horizontality of the second camera in response to the change in angle; determining whether the point of interest is changed based on an input image of the second camera; if the point of interest is not changed, controlling the first motor to maintain hovering by compensating for a tilt of the electronic device; if the point of interest is changed, controlling the first motor to maintain hovering by moving to an original position before moving and by compensating for the tilt, and if compensating for the tilt, controlling the second motor to control the second camera to maintain horizontality.

According to an embodiment of the present disclosure, the second camera may include an OFS module, and the first motor may include an electric motor for operating a propeller provided in the electronic device, and the second motor may include a driving motor for maintaining the electronic device upright regardless of a motion of the electronic device.

According to an embodiment of the present disclosure, the driving motor may include a first driving motor configured to maintain horizontality of the first camera and to adjust a rotation angle of the first camera in response to control of the first camera; and a second driving motor configured to maintain horizontality of the second camera, wherein the second driving motor may be formed at a position linearly extending from a rotation axis of the first driving motor.

According to an embodiment of the present disclosure, controlling the second camera to maintain horizontality may include, if the first camera is rotated using the first driving motor, offsetting the rotation of the second camera as much as the rotation of the first camera using the second driving motor.

According to an embodiment of the present disclosure, controlling the second camera to maintain horizontality may include, if adjusting the first driving motor to rotate the first camera, maintaining horizontality of the second camera by rotating the second driving motor by an angle corresponding to the rotation of the first driving motor in an opposite direction to the rotation of the first driving motor.

According to an embodiment of the present disclosure, the method may further include detecting a change in angle and a change in a reference position of the electronic device; tracking a reference point of interest in response to the change in the reference position being detected; determining a movement position of the electronic device based on a result of the tracking; determining a thrust corresponding to the determined movement position and controlling the electric motor based on the determined thrust; operating the propeller based on the electric motor and moving the electronic device to the determined movement position; and, if the electronic device reaches the determined movement position, compensating for the changed angle by controlling the driving motor and then maintaining hovering.

According to an embodiment of the present disclosure, detecting the change in the reference position may include identifying the reference point of interest based on an input image of the second camera; and determining whether a position of the electronic device is changed based on the reference point of interest.

According to an embodiment of the present disclosure, the method may further include controlling the first driving motor to maintain the first camera in a direction based on sensor information of the sensor during the flight operation of the electronic device; controlling the second driving motor to maintain horizontality of the second camera during the flight operation of the electronic device; if control of the first camera is detected, controlling the first driving motor to control a pitch axis rotation of the first camera; and controlling the second driving motor to maintain horizontality of the second camera opposite to the pitch axis rotation of the first camera.

According to an embodiment of the present disclosure, the method may further include generating a control signal for controlling a pitch angle of the first camera; identifying sensor information of the sensor; controlling the first driving motor for the first camera based on at least a part of the control signal and the sensor information; generating compensation data of the second driving motor for the second camera opposite to a rotation of the first driving motor; and based on the compensation data, controlling the second driving motor to rotate in an opposite direction to a rotation direction of the first driving motor, wherein the compensation data may be set as an opposite rotation angle corresponding to a rotation angle of the first driving motor to offset the rotation of the first driving motor.

According to the electronic device and the operating method thereof according to an embodiment of the present disclosure described above, the hovering state of the unmanned electronic device may be stably maintained. The unmanned electronic device may always maintain the OFS module horizontally to the ground while maintaining the hovering state.

According to an embodiment of the present disclosure, the hovering state may be stably maintained even if it is difficult to maintain horizontality of the unmanned electronic device due to an external factor (for example, an external force or wind) in a situation where the hovering state is maintained through the OFS module mounted in the unmanned electronic device. In a situation where the unmanned electronic device may be titled by an external factor, the OFS module may be made to always maintain horizontality to the ground, such that the hovering state may be maintained more swiftly and more efficiently without complicated image processing or calculation as in the conventional method. Unnecessary motor thrust operation may be reduced by efficiently maintaining the hovering state of the unmanned electronic device, and as a result, flight performance (for example, stable hovering, reduced power consumption, increased flight time, and the like) may be enhanced. The unmanned electronic device may contribute to enhancement of usability, convenience, and competitiveness of the unmanned electronic device.

While embodiments of the present disclosure have been described above, various changes may be made within limit without departing from the scope of the present disclosure. Therefore, the scope of the present disclosure is not intended to be limited to and defined by the above-described embodiments, but is defined by the appended claims and their equivalents.

What is claimed is:

1. An electronic device, comprising:
    a gimbal;
    a first camera configured to record an image;
    a second camera configured to detect a point of interest on a ground as an input image;
    at least one sensor configured to detect a motion of the electronic device;
    a first motor configured to generate a thrust related to a flight of the electronic device;
    a second motor configured to operate the first camera and the second camera to maintain horizontality; and
    at least one processor electrically connected to the first camera, the second camera, the at least one sensor, the first motor, and the second motor, wherein the at least one processor is configured to:
    detect a change in an angle of the electronic device by the at least one sensor during a hovering operation of the electronic device;
    control the second motor to control the second camera to maintain horizontality in response to the change in the angle of the electronic device;
    determine whether the point of interest is changed based on an input image of the second camera;
    if the point of interest is not changed, control the first motor to maintain hovering by compensating for a tilt of the electronic device; and
    if the point of interest is changed, control the first motor to maintain hovering by moving to an original position before moving and by compensating for the tilt,
    wherein, if compensating for the tilt, the at least one processor is further configured to control the second motor to control the second camera to maintain horizontality.

2. The electronic device of claim 1, wherein the second camera comprises an optical flow sensor (OFS) module.

3. The electronic device of claim 1, wherein the first motor comprises an electric motor configured to operate a propeller provided in the electronic device, and
    wherein the second motor comprises a driving motor configured to maintain the electronic device upright regardless of a motion of the electronic device.

4. The electronic device of claim 3, wherein the driving motor comprises:
    a first driving motor configured to maintain horizontality of the first camera and to adjust a rotation angle of the first camera in response to control of the first camera; and
    a second driving motor configured to maintain horizontality of the second camera,
    wherein the second driving motor is formed at a position linearly extending from a rotation axis of the first driving motor.

5. The electronic device of claim 4, wherein the at least one processor is further configured to:
   if the first camera is rotated using the first driving motor, offset the rotation of the second camera as much as the rotation of the first camera using the second driving motor.

6. The electronic device of claim 4, wherein the at least one processor is further configured to:
   if adjusting the first driving motor to rotate the first camera, maintain horizontality of the second camera by rotating the second driving motor by an angle corresponding to the rotation of the first driving motor in an opposite direction to the rotation of the first driving motor.

7. The electronic device of claim 4, wherein the at least one processor is further configured to:
   detect the change in the angle and a change in a reference position of the electronic device;
   track a reference point of interest in response to the change in the reference position being detected;
   determine a movement position of the electronic device based on a result of the tracking;
   determine a thrust corresponding to the determined movement position and control the electric motor based on the determined thrust;
   operate the propeller based on the electric motor and move the electronic device to the determined movement position; and
   if the electronic device reaches the determined movement position, compensate for the changed angle by controlling the driving motor and then maintaining hovering.

8. The electronic device of claim 7, wherein the at least one processor is further configured to identify the reference point of interest based on an input image of the second camera, and determine whether a position of the electronic device is changed based on the reference point of interest.

9. The electronic device of claim 4, wherein the at least one processor is further configured to:
   control the first driving motor to maintain the first camera in a normal direction based on sensor information of the at least one sensor during the flight of the electronic device;
   control the second driving motor to maintain horizontality of the second camera during the flight of the electronic device;
   if control of the first camera is detected, control the first driving motor to control a pitch axis rotation of the first camera; and
   control the second driving motor to maintain horizontality of the second camera opposite to the pitch axis rotation of the first camera.

10. The electronic device of claim 9, wherein the processor is further configured to:
    generate a control signal for controlling a pitch angle of the first camera;
    identify sensor information of the at least one sensor;
    control the first driving motor for the first camera based on at least a part of the control signal and the sensor information;
    generate compensation data of the second driving motor for the second camera opposite to a rotation of the first driving motor; and
    based on the compensation data, control the second driving motor to rotate in an opposite direction to a rotation direction of the first driving motor,
    wherein the compensation data is set as an opposite rotation angle corresponding to a rotation angle of the first driving motor to offset the rotation of the first driving motor.

11. The electronic device of claim 1, wherein the at least one processor comprises:
    a first processor configured to process an operation related to the flight of the electronic device; and
    a second processor configured to maintain the first camera and the second camera upright by the gimbal.

12. A method of operating an electronic device, the method comprising:
    controlling hovering of the electronic device using a first motor for a thrust related to a flight of the electronic device;
    during a hovering operation of the electronic device, controlling to maintain horizontality of a first camera for taking an image and horizontality of a second camera for detecting a point of interest on a ground as an input image;
    detecting a change in an angle of the electronic device during the hovering operation of the electronic device;
    controlling the second motor to maintain horizontality of the second camera in response to the change in the angle of the electronic device;
    determining whether the point of interest is changed based on an input image of the second camera;
    if the point of interest is not changed, controlling the first motor to maintain the hovering of the electronic device by compensating for a tilt of the electronic device; and
    if the point of interest is changed, controlling the first motor to maintain the hovering of the electronic device by moving to an original position before moving and by compensating for the tilt,
    wherein, if compensating for the tilt, controlling the second motor to control the second camera to maintain horizontality.

13. The method of claim 12, wherein the second camera comprises an optical flow sensor (OFS) module,
    wherein the first motor comprises an electric motor for operating a propeller provided in the electronic device, and
    wherein the second motor comprises a driving motor for maintaining the electronic device upright regardless of a motion of the electronic device.

14. The method of claim 13, wherein the driving motor comprises:
    a first driving motor configured to maintain horizontality of the first camera and to adjust a rotation angle of the first camera in response to control of the first camera; and
    a second driving motor configured to maintain horizontality of the second camera, and
    wherein the second driving motor is formed at a position linearly extending from a rotation axis of the first driving motor.

15. The method of claim 14, wherein controlling the second camera to maintain horizontality comprises, if the first camera is rotated using the first driving motor, offsetting the rotation of the second camera as much as the rotation of the first camera using the second driving motor.

16. The method of claim 14, wherein controlling the second camera to maintain horizontality comprises, if adjusting the first driving motor to rotate the first camera, maintaining horizontality of the second camera by rotating the second driving motor by an angle corresponding to the rotation of the first driving motor in an opposite direction to the rotation of the first driving motor.

17. The method of claim 14, further comprising:
detecting the change in the angle and a change in a reference position of the electronic device;
tracking a reference point of interest in response to the change in the reference position being detected;
determining a movement position of the electronic device based on a result of the tracking;
determining a thrust corresponding to the determined movement position and controlling the electric motor based on the determined thrust;
operating the propeller based on the electric motor and moving the electronic device to the determined movement position; and
if the electronic device reaches the determined movement position, compensating for the changed angle by controlling the driving motor and then maintaining hovering.

18. The method of claim 17, wherein detecting the change in the reference position comprises:
identifying the reference point of interest based on an input image of the second camera; and
determining whether a position of the electronic device is changed based on the reference point of interest.

19. The method of claim 14, further comprising:
controlling the first driving motor to maintain the first camera in a direction based on sensor information of the sensor during the flight operation of the electronic device;
controlling the second driving motor to maintain horizontality of the second camera during the flight operation of the electronic device;
if control of the first camera is detected, controlling the first driving motor to control a pitch axis rotation of the first camera; and
controlling the second driving motor to maintain horizontality of the second camera in opposite to the pitch axis rotation of the first camera.

20. The method of claim 19, further comprising:
generating a control signal for controlling a pitch angle of the first camera;
identifying sensor information of the at least one sensor;
controlling the first driving motor for the first camera based on at least a part of the control signal and the sensor information;
generating compensation data of the second driving motor for the second camera opposite to a rotation of the first driving motor; and
based on the compensation data, controlling the second driving motor to rotate in an opposite direction to a rotation direction of the first driving motor, and
wherein the compensation data is set as an opposite rotation angle corresponding to a rotation angle of the first driving motor to offset the rotation of the first driving motor.

* * * * *